(12) United States Patent
Akabane et al.

(10) Patent No.: US 6,757,233 B2
(45) Date of Patent: Jun. 29, 2004

(54) PRE-PIT DETECTING DEVICE AND BINARIZING LEVEL SETTING METHOD

(75) Inventors: Shin Akabane, Saitama-ken (JP); Junji Tanaka, Saitama-ken (JP)

(73) Assignee: Pioneer Corporation, Tokyo-to (JP)

( * ) Notice: Subject to any disclaimer, the term of this patent is extended or adjusted under 35 U.S.C. 154(b) by 8 days.

(21) Appl. No.: 10/045,037

(22) Filed: Jan. 15, 2002

(65) Prior Publication Data

US 2002/0105871 A1 Aug. 8, 2002

(30) Foreign Application Priority Data

Jan. 15, 2001 (JP) .................................... P2001-006568
Sep. 20, 2001 (JP) .................................... P2001-286949

(51) Int. Cl.[7] ................................................ G11B 7/00
(52) U.S. Cl. ............................. 369/59.17; 369/47.22; 369/47.28
(58) Field of Search .................. 369/275.3, 44.13, 369/47.1, 59.17, 47.27, 47.28, 47.25, 47.2, 47.21, 47.22

(56) References Cited

U.S. PATENT DOCUMENTS 6,519,214 B1 * 2/2003 Hikima .................... 369/44.26

* cited by examiner

*Primary Examiner*—Nabil Hindi
(74) *Attorney, Agent, or Firm*—Young & Thompson

(57) ABSTRACT

A composite signal in which pre-pit signal components are piggypacked onto frequency components of wobbling, is extracted from an optical recording medium. The composite signal is binarized, so that pre-pit signals are generated. The pre-pit signals pass through a first gate when the gate is open. The gate is periodically opened only in a period during which the amplitude of the wobbling becomes a maximum one. The number of the pre-pit signals passing through the gate is counted, so that a binarizing level for generating the pre-pit signal is set based on the relationship between the counted number per a reference time and a predetermined reference number.

23 Claims, 10 Drawing Sheets

PRE-PIT DETECTING DEVICE AND BINARIZING LEVEL SETTING METHOD

BACKGROUND OF THE INVENTION

1. Field of the Invention

This invention relates to a technical field of a pre-pit detecting device for detecting pre-pits as pre-information formed on a high density recording medium such as DVD-R (DVD-Recordable) or DVD-RW (DVD-Rerecordable). Especially, the invention relates to a technical field of a pre-pit detecting device capable of setting a binarizing level for generating pre-pit signals to an optimum one.

2. Description of Prior Art

Generally, on a recordable optical recording medium (disc), or a reference signal to generate address information and a clock signal for a use of recording and reproducing operation is recorded in advance in form of pre-pits or pre-groove on the optical record information in which record information is not recorded yet. For example, on DVD-R (Digital Versatile Disc-Recordable), a pre-groove, which is an area where information to be originally recorded such as video data or audio data is recorded as recording pits, and pre-pits (hereinafter referred to LPP (Land pre-pit)) on a land portion, which is an area between the pre-grooves, are recorded.

The pre-groove is slightly wobbled in the radius direction of the disc with a frequency (hereinafter referred to wobbling frequency) based on a reference clock used for rotate control of DVD-R. In the rotate control, the wobbling frequency is detected, and a feedback control is performed so that the wobbling frequency matches the frequency of the reference clock.

The LPPs are detected as follows: First, reflected light of a light beam applied to the pre-groove is received in a photo receiving unit, which is divided in two by a parting line at least optically parallel to the direction of a tangent to the pre-groove. Then, a difference signal (hereinafter referred to radial push-pull signal) is generated by computing a difference between a first readout signal and a second readout signal generated on the basis of electrical signals outputted from the photo receiving unit. The radial push-pull signal is compared with a predetermined binarizing level by an LPP signal binarizing circuit, so that a binarized signal (hereinafter referred to LPP signal) is generated. In accordance with the LPP signal detected by the above-mentioned processes, address information indicating the position of recording/reproducing on the recording medium, a recording clock signal for a use of recording operation and the like are generated.

The radial push-pull signal is a composite signal where the LPP is piggybacked onto the wobbling frequency components because of wobbling of the pre-groove in the direction of a radius of the disc as described above.

However, in a disc where information is recorded in high density such as DVD-R, there is a case where crosstalk between wobbling signal components of a pre-groove and those of adjacent pre-groove to which a light beam applies is occurred.

In the case where the crosstalk is occurred, interference between the wobbling signal components in the composite signal obtained as the radial push-pull signal and those of the adjacent pre-groove, is occurred, so that the amplitude of the wobbling signal is changed.

Therefore, the LPP signal components are piggybacked onto the wobbling signal, and the amplitude of the wobbling signal which becomes a base line voltage is changed, so that it is difficult to compare the radial push-pull signal with a fixed binarizing level in order to detect the LPP signal as a binarized signal.

An optimum value of a slice level such as the binarizing level differs according to uses of the LPP signal, for example, the generation of the address information or the generation of the recording clock signal. For the generation of the recording clock signal, it is enough to obtain a cycle of the LPP, so that it is unnecessary to detect the whole of the LPPs piggybaked onto the wobbling signal. However, binarizing noise components to obtain pseudo-LPP signal adversely affects the detection of the cycle, so that it is preferable that the binarizing level is as high as possible to make noise components reduce.

For the generation of the address information, if there are pseudo-LPP signals due to noise components more or less, it is preferable that the LPP signals piggybacked onto the wobbling signal are reliably detected. If proper LPP signals are reliably detected, it is possible to find and eliminate the pseudo-LPP signals. Therefore, it is preferable that the binarizing level is as low as possible in order to reliably detect the LPP signals.

SUMMARY OF THE INVENTION

The invention has been made in view of the above problems addressed by the prior art. An object of the invention is, therefore, to provide a pre-pit detecting device and a binarizing level setting method capable of immediately setting the binarizing level for a use of binarizing the LPP to optimum value.

The above object of the present invention can be achieved by a pre-pit detecting apparatus of the present invention for extracting a composite signal from an optical recording medium and binarizing the composite signal to generate a pre-pit signal. The optical recording medium has an information recording track wobbled at a predetermined frequency and pre-pits formed at a predetermined spacing on a guide track adjacent to the information recording track. In the composite signal, pre-pit signal components are superimposed on components of frequency of the wobbling. The pre-pit detecting apparatus is provided with: a binarizing level setting device for setting a binarizing level for the composite signal; a pre-pit signal generating device for comparing the extracted composite signal with the set binarizing level to generate a pre-pit signal; and a first gate for periodically opening its gate only in a period during which the amplitude of the wobbling becomes a maximum one to make the generated pre-pit signal pass through the gate, wherein the binarizing level setting device counts the number of the pre-pit signals passing through the first gate and sets the binarizing level based on the relationship between the counted number per a reference time and a predetermined reference number.

According to the present invention, a composite signal in which pre-pit signal components are superimposed onto frequency components of wobbling, is extracted from an optical recording medium. The composite signal is binarized, so that pre-pit signals are generated. The pre-pit signals pass through a first gate when the gate is open. The gate is periodically opened only in a period during which the amplitude of the wobbling becomes a maximum one. The number of the pre-pit signals passing through the gate is counted, so that a binarizing level for generating the pre-pit signal is set based on the relationship between the counted number per a reference time and a predetermined reference number. Accordingly, since it is possible to grasp whether the binarizing level is set to a higher one or lower one, it is possible to set the binarizing level to an optimum one immediately.

The above object of the present invention can be achieved by a pre-pit detecting apparatus of the present invention for extracting a composite signal from an optical recording medium and binarizing the composite signal to generate a pre-pit signal. The optical recording medium has an information recording track wobbled at a predetermined frequency and pre-pits formed at a predetermined spacing on a guide track adjacent to the information recording track. In the composite signal, pre-pit signal, components are superimposed on components of frequency of the wobbling. The pre-pit detecting apparatus is provided with: a binarizing level setting device for setting a binarizing level for the composite signal; a pre-pit signal generating device for comparing the extracted composite signal with the set binarizing level to generate a pre-pit signal; and a second gate for periodically opening its gate only in a period during which a sync bit is superimposed on the wobbling and the amplitude of the wobbling becomes a maximum one to make the generated pre-pit signal pass through the gate, wherein the binarizing level setting device counts the number of the pre-pit signals passing through the second gate and sets the binarizing level based on the relationship between the counted number per a reference time and a predetermined reference number.

According to the present invention, a composite signal in which pre-pit signal components are superimposed onto frequency components of wobbling, is extracted from an optical recording medium. The composite signal is binarized, so that pre-pit signals are generated. The pre-pit signals pass through a second gate when the gate is open. The gate is periodically opened only in a period during which a sync bit is superimposed on the wobbling and the amplitude of the wobbling becomes a maximum one. The number of the pre-pit signals passing through the gate is counted, so that a binarizing level for generating the pre-pit signal is set based on the relationship between the counted number per a reference time and a predetermined reference number. Accordingly, it is possible to set the binarizing level to an optimum one immediately. In addition, since the second gate is opened only in a period during which the pre-pit signal components are invariably superimposed on the wobbling, it is possible to count the pre-pit signals precisely. Therefore, the binarizing level which is set based on the relationship between the above-mentioned counted number per the reference number and the predetermined reference number, can be set to a more optimum one.

In one aspect of the present invention, the binarizing level setting device compares the counted number per the reference time with the predetermined reference number, and sets the binarizing level based on the results of comparing.

According to this aspect, it is possible to set the binarizing level to an optimum one immediately based on the results of comparing.

In another aspect of the present invention, the binarizing level setting device raises the binarizing level in the case where the counted number per the reference time is larger than the predetermined reference number, and lowers the binarizing level in the case where the counted number per the reference time is smaller than the predetermined reference number.

According to this aspect, it is possible to set the binarizing level to an optimum one immediately based on the counted number.

In further aspect of the present invention, the binarizing level setting device compares the counted number per the reference time with a predetermined range including the predetermined reference number, and sets the binarizing level based on the results of comparing.

According to this aspect, it is possible to set the binarizing level to an optimum one immediately based on the results of comparing. In addition, it is possible to ensure some margins of safety for setting the binarizing level.

In further aspect of the present invention, the binarizing level setting device raises the binarizing level in the case where the counted number per the reference time is larger than the predetermined range, and lowers the binarizing level in the case where the counted number per the reference time is smaller than the predetermined range.

According to this aspect, it is possible to set the binarizing level to an optimum one immediately based on the counted number. In addition, it is possible to ensure some margins of safety for setting the binarizing level.

The above object of the present invention can be achieved by a pre-pit detecting apparatus of the present invention for extracting a composite signal from an optical recording medium and binarizing the composite signal to generate a pre-pit signal. The optical recording medium has an information recording track wobbled at a predetermined frequency and pre-pits formed at a predetermined spacing on a guide track adjacent to the information recording track. In the composite signal, pre-pit signal components are superimposed on components of frequency of the wobbling. The pre-pit detecting apparatus apparatus is provided with: a binarizing level setting device for setting a binarizing level for the composite signal; a pre-pit signal generating device for comparing the extracted composite signal with the set binarizing level to generate a pre-pit signal; a first gate for periodically opening its gate only in a period during which the amplitude of the wobbling becomes a maximum one to make the generated pre-pit signal pass through the gate; and a second gate for periodically opening its gate only in a period during which a sync bit is superimposed on the wobbling and the amplitude of the wobbling becomes a maximum one to make the generated pre-pit signal pass through the gate, wherein the binarizing level setting device counts the number of the pre-pit signals passing through the first gate and the second gate respectively, and sets the binarizing level based on both the relationship between the number of the pre-pit signals passing through the first gate per a reference time and a predetermined first reference number, and the relationship between the number of the pre-pit signals passing through the second gate per a reference time and a predetermined second reference number.

According to the present invention, a composite signal in which pre-pit signal components are superimposed onto frequency components of wobbling, is extracted from an optical recording medium. The composite signal is binarized, so that pre-pit signals are generated. The pre-pit signals pass through a first gate when the gate is open. The first gate is periodically opened only in a period during which the amplitude of the wobbling becomes a maximum one. Further, the pre-pit signals pass through a second gate when the gate is open. The second gate is periodically opened only in a period during which a sync bit is superimposed on the wobbling and the amplitude of the wobbling becomes a maximum one. The number of the pre-pit signals passing through the first gate is counted, and the number of the pre-pit signals passing through the second gate is counted. Then, a binarizing level for generating the pre-pit signal is set based on the relationship between the number of the pre-pit signals passing through the first gate per the reference time and the predetermined first reference number, and the relationship between the number of the pre-pit signals passing through the second gate per the reference time and the predetermined second reference number. Accordingly, the binarizing level is set at two stages, it is possible to set the binarizing level to more optimum one.

The above object of the present invention can be achieved by a pre-pit detecting apparatus of the present invention for extracting a composite signal from an optical recording medium and binarizing the composite signal to generate a pre-pit signal. The optical recording medium has an information recording track wobbled at a predetermined frequency and pre-pits formed at a predetermined spacing on a guide track adjacent to the information recording track. In the composite signal, pre-pit signal components are superimposed on components of frequency of the wobbling. The pre-pit apparatus is provided with: a binarizing level setting device for setting a binarizing level for the composite signal; a pre-pit signal generating device for comparing the extracted composite signal with the set binarizing level to generate a pre-pit signal; and a first gate for periodically opening its gate only in a period during which the amplitude of the wobbling becomes a maximum one to make the generated pre-pit signal pass through the gate, wherein the binarizing level setting device gradually lowers the binarizing level from a high level to a low level, and counts the number of the pre-pit signals passing through the first gate during a reference time in each level and sets a level where the counted number per the reference time becomes within a predetermined range including the predetermined reference number as a reference binarizing level.

According to the present invention, while gradually lowering the binarizing level from a high level to a low level, the number of the pre-pit signals passing through the first gate is counted in each level during the reference time. Further, the level where the counted number per the reference time becomes within the predetermined range including the predetermined reference number, is set as the reference binarizing level. Therefore, since it is possible to grasp whether the binarizing level is set to a higher one or lower one, it is possible to set the binarizing level to an optimum one immediately. In addition, it is possible to set the reference binarizing level at an initial stage to an optimum one.

The above object of the present invention can be achieved by a pre-pit detecting apparatus of the present invention for extracting a composite signal from an optical recording medium and binarizing the composite signal to generate a pre-pit signal. The optical recording medium has an information recording track wobbled at a predetermined frequency and pre-pits formed at a predetermined spacing on a guide track adjacent to the information recording track. In the composite signal, pre-pit signal components are superimposed on components of frequency of the wobbling. The pre-pit detecting apparatus is provided with: a binarizing level setting device for setting a binarizing level for the composite signal; a pre-pit signal generating device for comparing the extracted composite signal with the set binarizing level to generate a pre-pit signal; and a second gate for periodically opening its gate only in a period during which a sync bit is superimposed on the wobbling and the amplitude of the wobbling becomes a maximum one to make the generated pre-pit signal pass through the gate, wherein the binarizing level setting device gradually lowers the binarizing level from a high level to a low level, and counts the number of the pre-pit signals passing through the second gate during a reference time in each level and sets a level where the counted number per the reference time becomes within a predetermined range including the predetermined reference number as a reference binarizing level.

According to the present invention, while gradually lowering the binarizing level from a high level to a low level, the number of the pre-pit signals passing through the second gate is counted in each level during the reference time. Further, the level where the counted number per the reference time becomes within the predetermined range including the predetermined reference number, is set as the reference binarizing level. Therefore, since the second gate is opened only in a period during which the pre-pit signal components are invariably superimposed on the wobbling, it is possible to count the pre-pit signals precisely. In addition, it is possible to set the reference binarizing level at an initial stage to an optimum one.

In one aspect of the present invention, the binarizing level setting device, after setting the reference binarizing level, raises the reference binarizing level in the case where the counted number per the reference time is larger than a predetermined range including the predetermined reference number, and lowers the reference binarizing level in the case where the counted number is smaller than the predetermined range.

According to this aspect, it is possible to set the reference binarizing level at an initial stage to an optimum one immediately.

The above object of the present invention can be achieved by a pre-pit detecting apparatus of the present invention for extracting a composite signal from an optical recording medium and binarizing the composite signal to generate a pre-pit signal. The optical recording medium has an information recording track wobbled at a predetermined frequency and pre-pits formed at a predetermined spacing on a guide track adjacent to the information recording track. In the composite signal, pre-pit signal components are superimposed on components of frequency of the wobbling. The pre-pit detecting apparatus is provided with: a binarizing level setting device for setting a binarizing level for the pre-pit signal for extracting at least address information as a binarizing level for an address, and for setting a binarizing level for the pre-pit signal for extracting at least a recording/reproducing clock as a binarizing level for a clock; a first pre-pit signal generating device for comparing the extracted composite signal with the set binarizing level for an address to generate a pre-pit signal for an address; a second pre-pit signal generating device for comparing the extracted composite signal with the set binarizing level for a clock to generate a pre-pit signal for a clock; and a first gate for periodically opening its gate only in a period during which the amplitude of the wobbling becomes a maximum one to make at least one pre-pit signal of the generated pre-pit signals pass through the gate, wherein the binarizing level setting devices gradually lower the respective binarizing levels from a high level to a low level, and count the number of the pre-pit signals passing through the first gate during a reference time in each level, and set a level where the counted number per the reference time becomes within a predetermined range including the predetermined reference number as a reference binarizing level, and sets the binarizing level for an address to a lower level than the reference binarizing level, and sets the binarizing level for a clock to a higher level than the reference binarizing level.

According to the present invention, Therefore, since it is possible to grasp whether the binarizing level is set to a higher one or lower one, it is possible to set the binarizing level to an optimum one immediately. In addition, it is possible to discriminate between the binarizing level for generating an pre-pit signal, which is used for generating the address information and various timing signals, and the binarizing level for generating another pre-pit signal, which is used for generating a recording clock signal, so that it is possible to set optimum binarizing levels for generating respective pre-pit signals.

The above object of the present invention can be achieved by a pre-pit detecting apparatus of the present invention for extracting a composite signal from an optical recording medium and binarizing the composite signal to generate a pre-pit signal. The optical recording medium has an information recording track wobbled at a predetermined frequency and pre-pits formed at a predetermined spacing on a guide track adjacent to the information recording track. In the composite signal, pre-pit signal components are superimposed on components of frequency of the wobbling. The pre-pit detecting apparatus is provided with: a binarizing level setting device for setting a binarizing level for the pre-pit signal for extracting at least address information as a binarizing level for an address, and for setting a binarizing level for the pre-pit signal for extracting at least a recording/reproducing clock as a binarizing level for a clock; a first pre-pit signal generating device for comparing the extracted composite signal with the set binarizing level for an address to generate a pre-pit signal for an address; a second pre-pit signal generating device for comparing the extracted composite signal with the set binarizing level for a clock to generate a pre-pit signal for a clock; and a second gate for periodically opening its gate only in a period during which a sync bit is superimposed on the wobbling and the amplitude of the wobbling becomes a maximum one to make the generated pre-pit signal pass through the gate, wherein the binarizing level setting devices gradually lower the respective binarizing levels from a high level to a low level, and count the number of the pre-pit signals passing through the second gate during a reference time in each level, and set a level where the counted number per the reference time becomes within a predetermined range including the predetermined reference number as a reference binarizing level, and sets the binarizing level for an address to a lower level than the reference binarizing level, and sets the binarizing level for a clock to, a higher level than the reference binarizing level.

According to the present invention, Therefore, since the second gate is opened only in a period during which the pre-pit signal components are invariably superimposed on the wobbling, it is possible to count the pre-pit signals precisely. In addition, it is possible to discriminate between the binarizing level for generating an pre-pit signal, which is used for generating the address information and various timing signals, and the binarizing level for generating another pre-pit signal, which is used for generating a recording clock signal, so that it is possible to set optimum binarizing levels for generating respective pre-pit signals.

In one aspect of the present invention, the binarizing level setting device, after setting the binarizing levels, raises the reference binarizing level, the binarizing level for an address, and the binarizing level for a clock in the case where the counted number per the reference time is larger than the predetermined range including the predetermined reference number, and lowers the reference binarizing level, the binarizing level for an address, and the binarizing level for a clock in the case where the counted number is smaller than the predetermined range.

According to this aspect, based on the counted number, it is possible to discriminate between the binarizing level for generating an pre-pit signal, which is used for generating the address information and various timing signals, and the binarizing level for generating another pre-pit signal, which is used for generating a recording clock signal, so that it is possible to set optimum binarizing levels for generating respective pre-pit signals.

The above object of the present invention can be achieved by a binarizing level setting method of the present invention for setting a binarizing level for binarizing a composite signal extracted from an optical recording medium to generate a pre-pit signal. The optical recording medium has an information recording track wobbled at a predetermined frequency and pre-pits formed at a predetermined spacing on a guide track adjacent to the information recording track. In the composite signal, pre-pit signal components are superimposed on components of frequency of the wobbling. The binarizing level setting method is provided with the processes of: provisionally setting a binarizing level for the composite signal; comparing the extracted composite signal with the set binarizing level; generating a pre-pit signal based on the results of comparing; counting the number of the pre-pit signals passing through a first gate during a reference time, said first gate periodically opening its gate only in a period during which the amplitude of the wobbling becomes a maximum one to make the generated pre-pit signal pass through the gate; and setting the binarizing level based on the relationship between the counted number per the reference time and a predetermined reference number.

According to the present invention, since it is possible to grasp whether the binarizing level is set to a higher one or lower one, it is possible to set the binarizing level to an optimum one immediately.

The above object of the present invention can be achieved by a binarizing level setting method of the present invention for setting a binarizing level for binarizing a composite signal extracted from an optical recording medium to generate a pre-pit signal. The optical recording medium has an information recording track wobbled at a predetermined frequency and pre-pits formed at a predetermined spacing on a guide track adjacent to the information recording track. In the composite signal, pre-pit signal components are superimposed on components of frequency of the wobbling. The binarizing level setting method is provided with the processes of: provisionally setting a binarizing level for the composite signal; comparing the extracted composite signal with the set binarizing level; generating a pre-pit signal based on the results of comparing; counting the number of the pre-pit signals passing through a second gate during a reference time, said second gate periodically opening its gate only in a period during which a sync bit is superimposed on the wobbling and the amplitude of the wobbling becomes a maximum one to make the generated pre-pit signal pass through the gate; and setting the binarizing level based on the relationship between the counted number per the reference time and a predetermined reference number.

According to the present invention, it is possible to set the binarizing level to an optimum one immediately. In addition, since the second gate is opened only in a period during which the pre-pit signal components are invariably superimposed on the wobbling, it is possible to count the pre-pit signals precisely. Therefore, the binarizing level which is set based on the relationship between the above-mentioned counted number per the reference number and the predetermined reference number, can be set to a more optimum one.

The above object of the present invention can be achieved by a binarizing level setting method of the present invention for setting a binarizing level for binarizing a composite signal extracted from an optical recording medium to generate a pre-pit signal. The optical recording medium has an information recording track wobbled at a predetermined frequency and pre-pits formed at a predetermined spacing on a guide track adjacent to the information recording track. In the composite signal, pre-pit signal components are superimposed on components of frequency of the wobbling. The binarizing level setting method is provided with the processes of: provisionally setting a binarizing level for the composite signal; comparing the extracted composite signal with the set binarizing level; generating a pre-pit signal based on the results of comparing; counting the number of the pre-pit signals passing through a first gate during a reference time, said first gate periodically opening its gate only in a period during which the amplitude of the wobbling becomes a maximum one to make the generated pre-pit signal pass through the gate; and counting the number of the pre-pit signals passing through a second gate during a reference time, said second gate periodically opening its gate only in a period during which a sync bit is superimposed on the wobbling and the amplitude of the wobbling becomes a maximum one to make the generated pre-pit signal pass through the gate; and setting the binarizing level based on both the relationship between the number of the pre-pit signals passing through the first gate per the reference time and a predetermined first reference number, and the relationship between the number of the pre-pit signals passing through the second gate per the reference time and a predetermined second reference number.

According to the present invention, the binarizing level is set at two stages, it is possible to set the binarizing level to more optimum one.

The above object of the present invention can be achieved by a binarizing level setting method of the present invention for setting a binarizing level for binarizing a composite signal extracted from an optical recording medium to generate a pre-pit signal. The optical recording medium has an information recording track wobbled at a predetermined frequency and pre-pits formed at a predetermined spacing on a guide track adjacent to the information recording track. In the composite signal, pre-pit signal components are superimposed on components of frequency of the wobbling. The binarizing level setting method is provided with the processes of: provisionally setting a binarizing level for the composite signal; comparing the extracted composite signal with the set binarizing level; generating a pre-pit signal based on the results of comparing; counting the number of the pre-pit signals passing through a first gate during a reference time while gradually lowering the binarizing level from a high level to a low level, said first gate periodically opening its gate only in a period during which the amplitude of the wobbling becomes a maximum one to make the generated pre-pit signal pass through the gate; and setting a level where the counted number per the reference time becomes within a predetermined range including a predetermined reference number as a reference binarizing level.

According to the present invention, since it is possible to grasp whether the binarizing level is set to a higher one or lower one, it is possible to set the binarizing level to an optimum one immediately. In addition, it is possible to set the reference binarizing level at an initial stage to an optimum one.

The above object of the present invention can be achieved by a binarizing level setting method of the present invention for setting a binarizing level for binarizing a composite signal extracted from an optical recording medium to generate a pre-pit signal. The optical recording medium has an information recording track wobbled at a predetermined frequency and pre-pits formed at a predetermined spacing on a guide track adjacent to the information recording track. In the composite signal, pre-pit signal components are superimposed on components of frequency of the wobbling. The binarizing level setting method is provided with the processes of: provisionally setting a binarizing level for the composite signal; comparing the extracted composite signal with the set binarizing level; generating a pre-pit signal based on the results of comparing; counting the number of the pre-pit signals passing through a second gate during a reference time while gradually lowering the binarizing level from a high level to a low level, said second gate periodically opening its gate only in a period during which a sync bit is superimposed on the wobbling and the amplitude of the wobbling becomes a maximum one to make the generated pre-pit signal pass through the gate; and setting a level where the counted number per the reference time becomes within a predetermined range including a predetermined reference number as a reference binarizing level.

According to the present invention, since the second gate is opened only in a period during which the pre-pit signal components are invariably superimposed on the wobbling, it is possible to count the pre-pit signals precisely. In addition, it is possible to set the reference binarizing level at an initial stage to an optimum one.

The above object of the present invention can be achieved by a pre-pit detecting apparatus of the present invention for extracting a composite signal from an optical recording medium and binarizing the composite signal to generate a pre-pit signal. The optical recording medium has an information recording track wobbled at a predetermined frequency and pre-pits formed at a predetermined spacing on a guide track adjacent to the information recording track. In the composite signal, pre-pit signal components are superimposed on components of frequency of the wobbling. The pre-pit detecting apparatus is provided with: a binarizing level setting device for setting a binarizing level for the composite signal; and a pre-pit signal generating device for comparing the extracted composite signal with the set binarizing level to generate a pre-pit signal, wherein the binarizing level setting device counts the number of the pre-pit signals generated by the pre-pit signal generating device and sets the binarizing level based on the relationship between the counted number per a reference time and a predetermined reference number.

According to the present invention, in the case where there is no pseudo- pre-pit signal or are few pseudo- pre-pit signal due to noise components, even if the above-mentioned gate is eliminated, it is possible to set the binarizing level to an optimum one immediately by counting the pre-pit signals and setting the binarizing level based on the relationship between the counted number per the reference time and the predetermined reference number.

The above object of the present invention can be achieved by a pre-pit detecting apparatus of the present invention for extracting a composite signal from an optical recording medium and binarizing the composite signal to generate a pre-pit signal. The optical recording medium has an information recording track wobbled at a predetermined frequency and pre-pits formed at a predetermined spacing on a guide track adjacent to the information recording track. In the composite signal, pre-pit signal components are superimposed on components of frequency of the wobbling. The pre-pit detecting apparatus is provided with: a binarizing level setting device for setting a binarizing level for the composite signal; and a pre-pit signal generating device for comparing the extracted composite signal with the set binarizing level to generate a pre-pit signal, wherein the binarizing level setting device gradually lowers the binarizing level from a high level to a low level, and counts the number of the pre-pit signals generated by the pre-pit signal generating device during a reference time in each level and sets a level where the counted number per the reference time becomes within a predetermined range including the predetermined reference number as a reference binarizing level.

According to the present invention, in the case where there is no pseudo- pre-pit signal or are few pseudo- pre-pit signal due to noise components, even if the above-mentioned gate is eliminated, it is possible to set the binarizing level to an optimum one immediately by counting the pre-pit signals and setting the binarizing level based on the relationship between the counted number per the reference time and the predetermined reference number.

The above object of the present invention can be achieved by a pre-pit detecting apparatus of the present invention for extracting a composite signal from an optical recording medium and binarizing the composite signal to generate a pre-pit signal. The optical recording medium has an information recording track wobbled at a predetermined frequency and pre-pits formed at a predetermined spacing on a guide track adjacent to the information recording track. In the composite signal, pre-pit signal components are superimposed on components of frequency of the wobbling. The pre-pit detecting apparatus is provided with: a binarizing level setting device for setting a binarizing level for the pre-pit signal for extracting at least address information as a binarizing level for an address, and for setting a binarizing level for the pre-pit signal for extracting at least a recording/reproducing clock as a binarizing level for a clock; a first pre-pit signal generating device for comparing the extracted composite signal with the set binarizing level for an address to generate a pre-pit signal for an address; a second pre-pit signal generating device for comparing the extracted composite signal with the set binarizing level for a clock to generate a pre-pit signal for a clock, wherein the binarizing level setting devices gradually lower the respective binarizing levels from a high level to a low level, and count the number of the pre-pit signals generated by the binarizing level setting device during a reference time in each level, and set a level where the counted number per the reference time becomes within a predetermined range including the predetermined reference number as a reference binarizing level, and sets the binarizing level for an address to a lower level than the reference binarizing level, and sets the binarizing level for a clock to a higher level than the reference binarizing level.

According to the present invention, in the case where there is no pseudo- pre-pit signal or are few pseudo- pre-pit signal due to noise components, even if the above-mentioned gate is eliminated, it is possible to set the binarizing level to an optimum one immediately by counting the pre-pit signals and setting the binarizing level based on the relationship between the counted number per the reference time and the predetermined reference number.

The above object of the present invention can be achieved by a binarizing level setting method of the present invention for setting a binarizing level for binarizing a composite signal extracted from an optical recording medium to generate a pre-pit signal. The optical recording medium has an information recording track wobbled at a predetermined frequency and pre-pits formed at a predetermined spacing on a guide track adjacent to the information recording track. In the composite signal, pre-pit signal components are superimposed on components of frequency of the wobbling. The binarizing level setting method is provided with the processes of: provisionally setting a binarizing level for the composite signal; comparing the extracted composite signal with the set binarizing level; generating a pre-pit signal based on the results of comparing; counting the number of the generated pre-pit signals during a reference time; and setting the binarizing level based on the relationship between the counted number per the reference time and a predetermined reference number.

According to the present invention, in the case where there is no pseudo- pre-pit signal or are few pseudo- pre-pit signal due to noise components, even if the above-mentioned gate is eliminated, it is possible to set the binarizing level to an optimum one immediately by counting the pre-pit signals and setting the binarizing level based on the relationship between the counted number per the reference time and the predetermined reference number.

The above object of the present invention can be achieved by a binarizing level setting method of the present invention for setting a binarizing level for binarizing a composite signal extracted from an optical recording medium to generate a pre-pit signal. The optical recording medium having an information recording track wobbled at a predetermined frequency and pre-pits formed at a predetermined spacing on a guide track adjacent to the information recording track. In the composite signal, pre-pit signal components are superimposed on components of frequency of the wobbling. The binarizing level setting method is provided with the processes of: provisionally setting a binarizing level for the composite signal; comparing the extracted composite signal with the set binarizing level; generating a pre-pit signal based on the results of comparing; counting the number of the generated pre-pit signals while gradually lowering the binarizing level from a high level to a low level; and setting a level where the counted number per the reference time becomes within a predetermined range including a predetermined reference number as a reference binarizing level, According to the present invention, in the case where there is no pseudo- pre-pit signal or are few pseudo- pre-pit signal due to noise components, even if the above-mentioned gate is eliminated, it is possible to set the binarizing level to an optimum one immediately by counting the pre-pit signals and setting the binarizing level based on the relationship between the counted number per the reference time and the predetermined reference number.

DETAILED DESCRIPTION OF THE PREFERRED EMBODIMENTS

The following section will describe preferred embodiments of the present invention with reference to the accompanying drawings. It should be noted that the embodiments to be described below assume a pre-pit detecting device for detecting pre-pits from a DVD-R as a recording medium on which reference signals for generating address information indicative of an information recording position on the recording medium and for generating clock signals for use in recording and reproducing operations are formed as LPPs.

Figure 1:
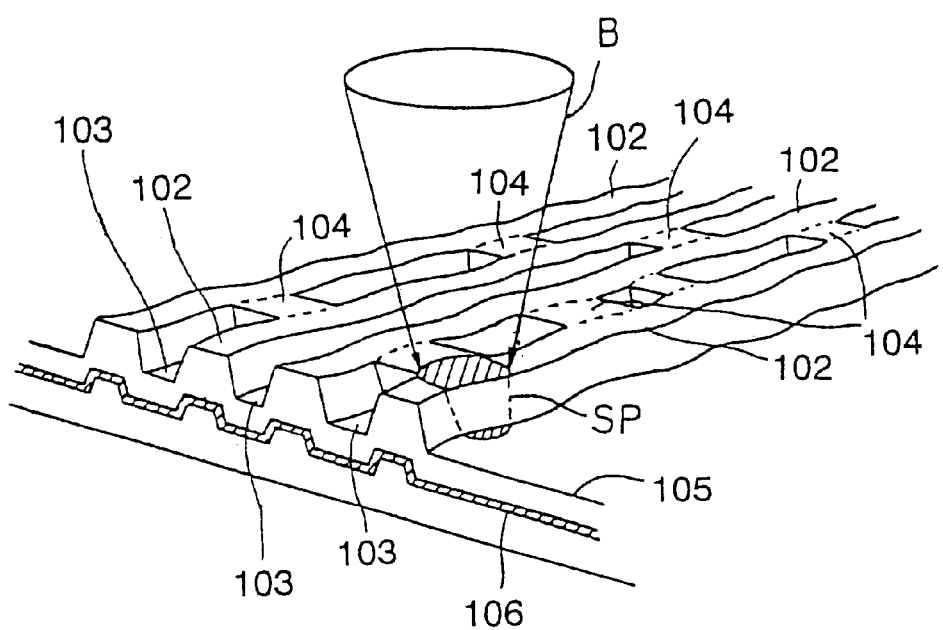
FIG. 1 is a cross-sectional perspective view of a DVD-R 50 according to embodiments of the present invention.

Referring first to FIG. 1, description will be made about the physical structure of the DVD-R according to an embodiment of the present invention. FIG. 1 is a cross-sectional perspective view of the DVD-R 50 according to the embodiment of the present invention. As shown in FIG. 1, the DVD-R 50 is a pigment type DVD-R which is provided with a pigment film 105 capable of writing information once. Pre-grooves 102 as information tracks on which record information is to be recorded, and lands 103 as guide tracks for guiding a light beam B like a laser beam as reproducing and recording light to the pre-grooves 102 are formed on the DVD-R 50. The DVD-R 50 is also provided with a protective film for protecting the pre-grooves and the lands, and a reflection surface 106 for reflecting the optical beam B at the time of reproduction of record information. Then LPPs 104 are formed on the lands 103.

In the DVD-R 50, the pre-grooves 102 are wobbled at a frequency used as a standard of reference to the rotation speed of the DVD-R 50. Upon recording on the DVD-R 50 record information (information such as image information intended to be recorded other than pre-information and sync signals), the wobbling frequency of the pre-grooves 102 is detected at an information recording apparatus to obtain a sync signal so that the DVD-R 50 will be controlled to rotate at a predetermined speed. At this time, the LPPs 104 are also detected to obtain pre-information beforehand so as to obtain address information and the like indicative of information recording positions on the DVD-R 50. Thus the record information is recorded at a corresponding recording position based on the address information.

In recording the record information, the light beam B is so irradiated that the center of the light beam B will coincide with the center of a corresponding pre-groove 102. As a result, a recording information pit corresponding to the record information is formed on the pre-groove 102 to form the record information. At this time, the size of the light spot is so set that the light spot is irradiated not only to the pre-groove 102 but partially to the adjacent land 103 as well. Using reflected light of the light spot partially irradiated to the land 103, pre-information is detected from the LPP 104 by a push-pull method to obtain the pre-information. On the other hand, using reflected light of the light spot irradiated to the pre-groove 102, a wobble signal is detected from the pre-groove 102 to obtain a clock signal for rotation control.

Figure 2:
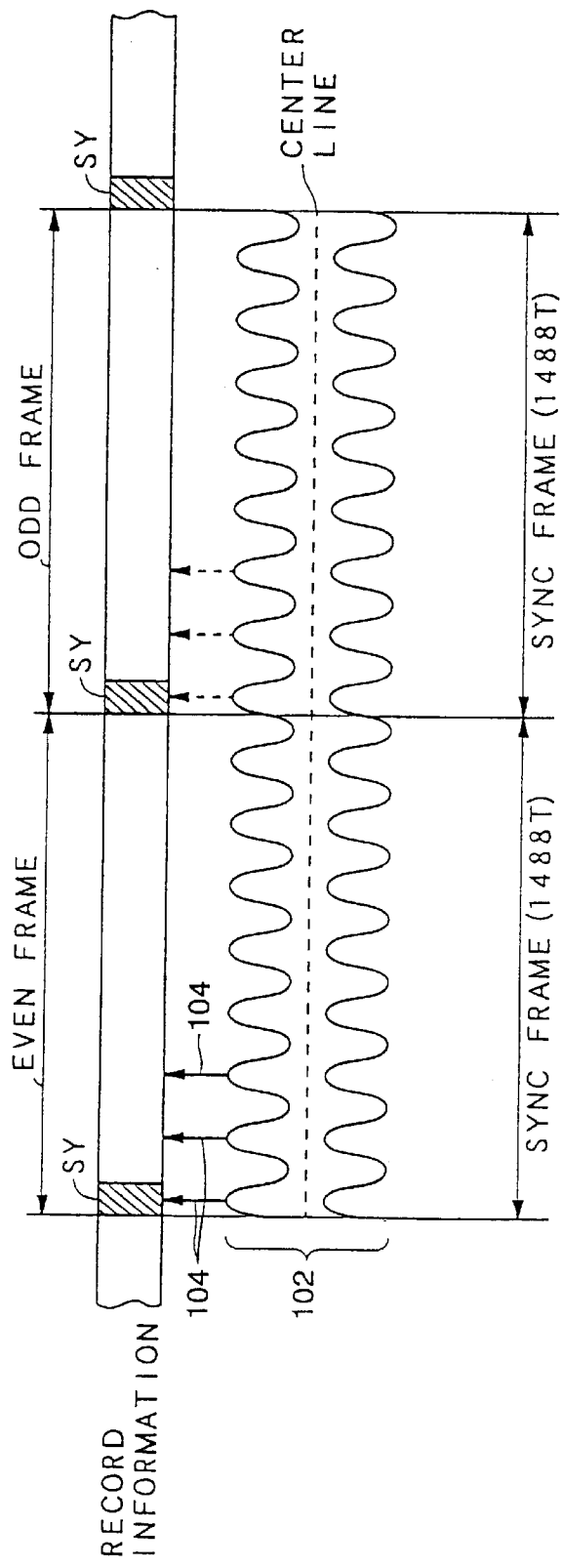
FIG. 2 is a schematic diagram showing a record format of pre-information and rotation control information pre-recorded on the DVD-R 50.

Referring next to FIG. 2, description will be made about a record format of the pre-information and rotation control information pre-recorded on the DVD-R 50. It should be noted that the term "pre-recorded" means "preformed" as a disk. FIG. 2 is a schematic diagram showing a record format of the pre-information and rotation control information pre-recorded on the DVD-R 50. In FIG. 2, the upper portion shows a record format of the record information, and corrugated waveforms of the lower portion show a wobbling state (a plan view) of the pre-grooves 102 for recording the record information. Further, upward arrows between the record information and the wobbling state of the pre-grooves 102 schematically show positions at which LPPs 104 are formed. It should be noted that in FIG. 2 the wobbling state of the pre-grooves 102 is shown with amplitude greater than actual amplitude for the sake of clarity. Further, the record information is recorded on the centerline of each corresponding pre-groove 102.

As shown in FIG. 2, the record information to be recorded on the DVD-R 50 is divided beforehand on a sync-frame basis. 26 sync frames form one recording sector as an information unit, and 16 recording sectors form one ECC block as an information block. It should be noted that one sync frame has a length 1488 times (1488T) longer than the unit length (hereinafter called T) corresponding to a bit interval defined by the record format for recording the above-mentioned record information. Further, sync information SY for synchronization on a sync-frame basis is recorded in the top 14 T portion of each sync frame.

On the other hand, the pre-information to be recorded on the DVD-R 50 is recorded on a sync-frame basis. In recording the pre-information using the LPPs 104, one LPP 104, as indicating a sync signal in the pre-information, is always formed on the land 103 adjacent to a region in which the sync information SY is recorded for each sync frame of the record information. Meanwhile, one or two LPPs 104 indicative of the contents of the pre-information to be recorded are formed on the land 103 adjacent to the first half of the sync frame containing information other than the sync information SY (or no LPP 104 may be formed with respect to the first half of the sync frame containing information other than the sync information SY, depending on the contents of the pre-information to be recorded). At this time, the LPPs 104 are formed in either even-numbered frames (hereinafter called the "EVEN frames") or odd-numbered frames (hereinafter called the "ODD frames") of each recording sector to record the pre-information. In other words, if the LPPs 104 are formed in the EVEN frames in FIG. 2 (as indicated with the solid upward arrows), no LPPs 104 will be formed in the ODD frames adjacent to the EVEN frames.

The relationship between the wobbling state of the pre-grooves 102 and the LPPs 104 is accounted for by the fact that the LPPs 104 are formed in positions where the amplitude of wobbling becomes the maximum.

On the other hand, the pre-grooves 102 are wobbled all over the sync frames on a constant wobbling frequency, f0 of 140 kHz (at which one sync frame corresponds to a part for eight waves of the fluctuating waveform of the pre-grooves 102). Then the constant wobbling frequency, f0 is detected by a pre-pit detecting device or the like to extract a sync signal for use in controlling the revolution of a spindle motor, not shown, for rotating the DVD-R 50.

Figure 3:
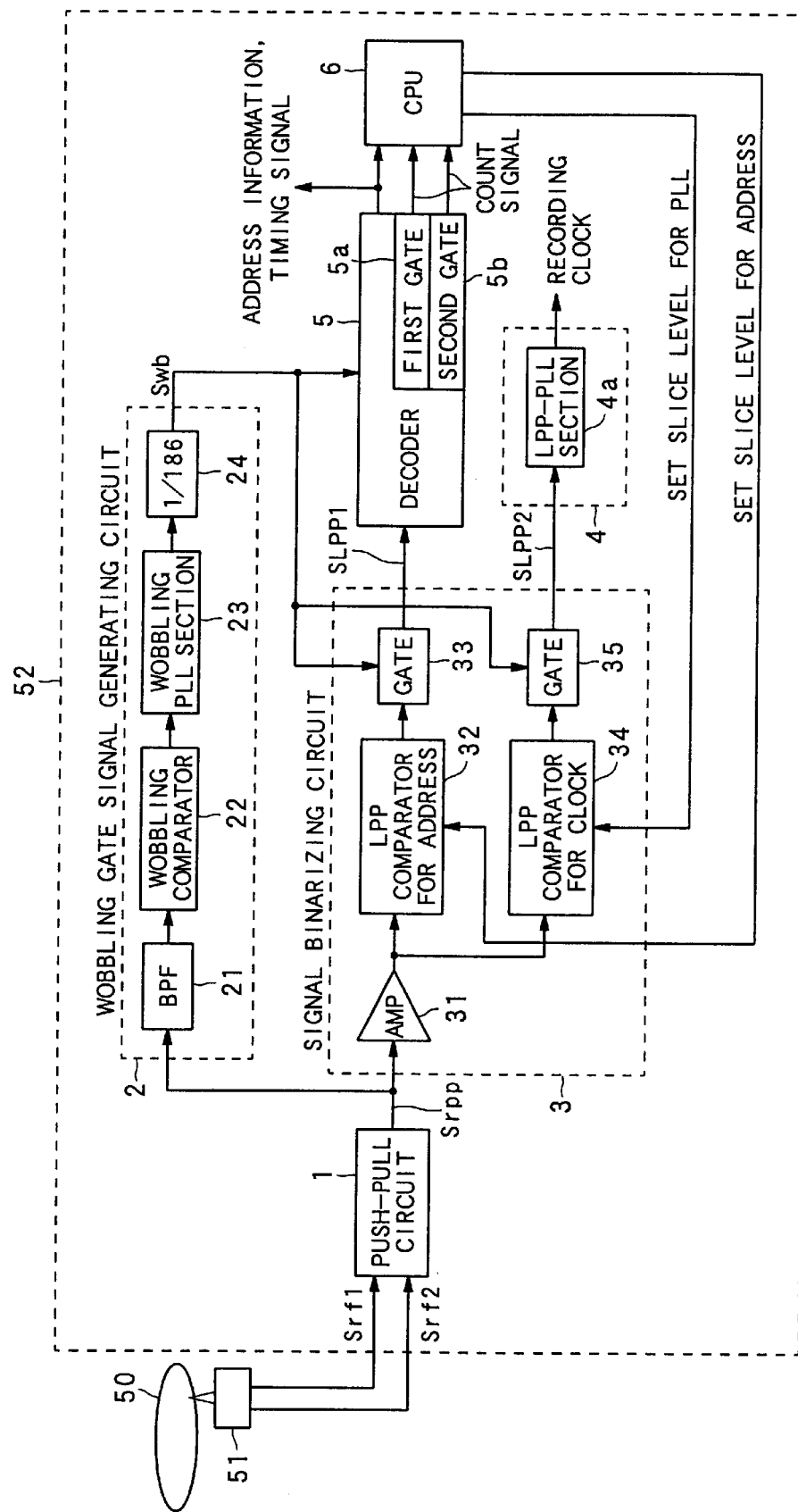
FIG. 3 is a block diagram showing a schematic configuration of a pre-pit detecting apparatus 52 of the embodiments.

Referring next to FIGS. 3 through 10, description will be made about a pre-pit detecting device for detecting pre-pits from the above-mentioned DVD-R 50 according to the present invention. FIG. 3 is a block diagram showing the general structure of a pre-pit detecting device 52 as practiced in the embodiment. It should be noted that the pre-pit detecting device according to the present invention is applied to an information recording and reproducing apparatus for recording media in an actual situation, but description of the structure and operation of apparatus components other than the pre-pit detecting device 52 will be omitted in the embodiment.

First, the structure and functions of the pre-pit detecting device 52 will be described below. As shown in FIG. 3, the pre-pit detecting device 52 includes a push-pull circuit 1, a wobble gate signal generating circuit 2, a signal binarizing circuit 3, a clock signal generating circuit 4, decoder 5 and a CPU 6. In operation, a first read signal Srf1 and a second read signal Srf2 are input from a pickup 51 to the push-pull circuit 1 of the pre-pit detecting device 52. The first read signal Srf1 and the second read signal Srf2 are generated as follows. First, a light beam is irradiated from the pickup 51. Then reflected light from the information recording surface of the DVD-R 50 driven to rotate is received at a light receiving portion, not shown, which is divided into two parts by a division line at least optically parallel with the tangential direction of the pre-grooves 102 on the DVD-R 50. The light receiving portion outputs electrical signals according to the amounts of reflected light received at the light receiving portion, so that the first and second read signals are generated on the basis of the electrical signals.

The push-pull circuit 1 is provided with an AGC (Auto Gain Control) circuit. The AGC circuit computes the difference between the amplitude of the first read signal Srf1 and the amplitude of the second read signal Srf2, and then generates (extracts) a radial push-pull signal from the uniformized first read signal Srf1 and second read signal Srf2 to output it to the wobble gate signal generating circuit 2 and signal binarizing circuit 3. The radial push-pull signal Srpp becomes a composite signal in which an LPP signal is piggybacked onto wobbling frequency components (hereinafter referred to wobbling singal components).

As shown FIG. 3, the wobble gate signal generating circuit 2 includes a BPF (Band Pass Filter) 21, a wobble comparator 22, a wobble PLL (Phase Locked Loop) section 23, and $1/186$ section 24. The BPF 21 extracts wobble signal components from the radial push-pull signal Srpp. Namely, the LPP signal components and noise components are eliminated from the radial push-pull signal Srpp.

The wobble comparator 22 compare the extracted wobble signal components with a predetermined reference value to output a pulse signal only for a period during which the level of the wobble signal components is larger than the reference value. Namely, the wobble comparator 22 converts the wobble signal components into a pulse train. The pulse train periodically indicates a high level for a predetermined period during which the amplitude of the wobbling becomes a maximum one.

The wobble PLL section 23 generates a clock signal (for example, 27 MHz), which is in synchronization with a phase of the pulse-converted wobble signal components. The $1/186$ section 24 supplies a signal, whose frequency is $1/186^{th}$ of the generated clock, as a wobble gate signal Swb to gates 33, 34 of the signal binarizing circuit 3 described later and the decoder 5.

As shown in FIG. 3, the signal binarizing circuit 3 includes: an amplifier 31; two comparators as an LPP signal generating means; and gates 33, 35. An address-LPP comparator 32 of the two comparators functions as means for generating an LPP signal for an address. The address-LPP comparator 32 compares the radial push-pull signal Srpp input through the amplifier 31 with binarizing level for an address which is set and provided by the CPU6, described later, to generate an LPP signal for generating address information indicating the position of the recording medium on which information should be recorded and various timing signals. On the other hand, a clock-LPP comparator 34 functions as means for generating an LPP signal for a clock. The clock-LPP comparator 34 compares the radial push-pull signal Srpp input through the amplifier 31 with binarizing level for address which is set and provided by the CPU6, described later, to generate an LPP signal for generating recording clock signal. However, these LPP signals includes pseudo-LPP signal components due to noise components at that stage where the address-LPP comparator 32 and clock-LPP comparator 34 generate them.

The LPP signal generated by the address-LPP comparator 32 is supplied to the gate 33. The gate 33 pulls through the LPP signal supplied by the address-LPP comparator 32 while the wobble gate signal supplied by the wobble gate signal generating circuit 2 is high level. Namely, as described above, the LPPs 104 are formed at the positions where the amplitude of the wobbling becomes a maximum one. Therefore, it is enough for extracting of the LPP signals to make the wobble gate signals Swb high level only in close to the positions. As a result, noise components are eliminated.

On the other hand, the LPP signal generated by the clock-LPP comparator 34 is supplied to the gate 35. The gate 35, as with the gate 33, pulls through the LPP signal supplied by the clock-LPP comparator 34 while the wobble gate signal Swb supplied by the wobble gate signal generating circuit 2 is high level.

In this manner, an LPP signal $S_{LPP1}$ which passed through the gate 33 is supplied to the decoder 5, and an LPP signal $S_{LPP2}$ which passed through the gate 35 is supplied to the clock signal generating circuit 4. The clock signal generating circuit 4, which has an LPP-PLL section 4a, generates a recording clock in phase with the input LPP signal $S_{LPP2}$ to output it to an encoder or the like, which are not described in the drawings. The decoder 5 extracts address information, indicating the position where information should be recorded, and various timing signals by decoding the input LPP signal $S_{LPP1}$, to output them to the CPU6 and the like.

The decoder 5 has a first gate 5a and second gate 5b. The first gate 5a is closed or opened in sync with the wobble gate signal Swb supplied by the wobble gate signal generating circuit 2. Namely, the first gate 5a is periodically opened in a period during which the amplitude of the wobbling becomes a maximum one. Then, the LPP signal $S_{LPP1}$, supplied to the decoder 5 in a period during which the first gate 5a is opened, is output to the CPU 6.

On the other hand, the second gate 5b is closed or opened in sync with the input cycle of the LPP signal $S_{LPP1}$ of a sync bit after the input cycle is detected by the decoder 5. Therefore, the timing of the start of closing and opening is delayed compared with that of the first gate 5a. Namely, the second gate 5b is periodically opened in a period during which the amplitude of the wobbling becomes a maximum one where the sync bit is piggybacked onto the wobbling. Then, the LPP signal $S_{LPP1}$, supplied to the decoder 5 in a period during which the second gate 5b is opened, is output to the CPU 6. Thus, the second gate 5b is reliably opened only in a period during which the LPP signal $S_{LPP1}$ of the sync bit is input. Therefore, the frequency with which the second gate 5b is opened is lower than that with which the first gate 5a is done. For example, in one sync frame in the embodiment, the first gate 5a is opened 8 times, however, the second gate 5b is opened once. Further, if the LPP 104 is formed in the EVEN frame, the second gate 5b is not opened with respect to the ODD frame. In addition, the second gate 5b is opened only in a period during which the LPP signal components are always piggybacked onto the wobbling, so that it can prevent the noise components from passing through more effectively than the first gate 5a does.

Figure 4:
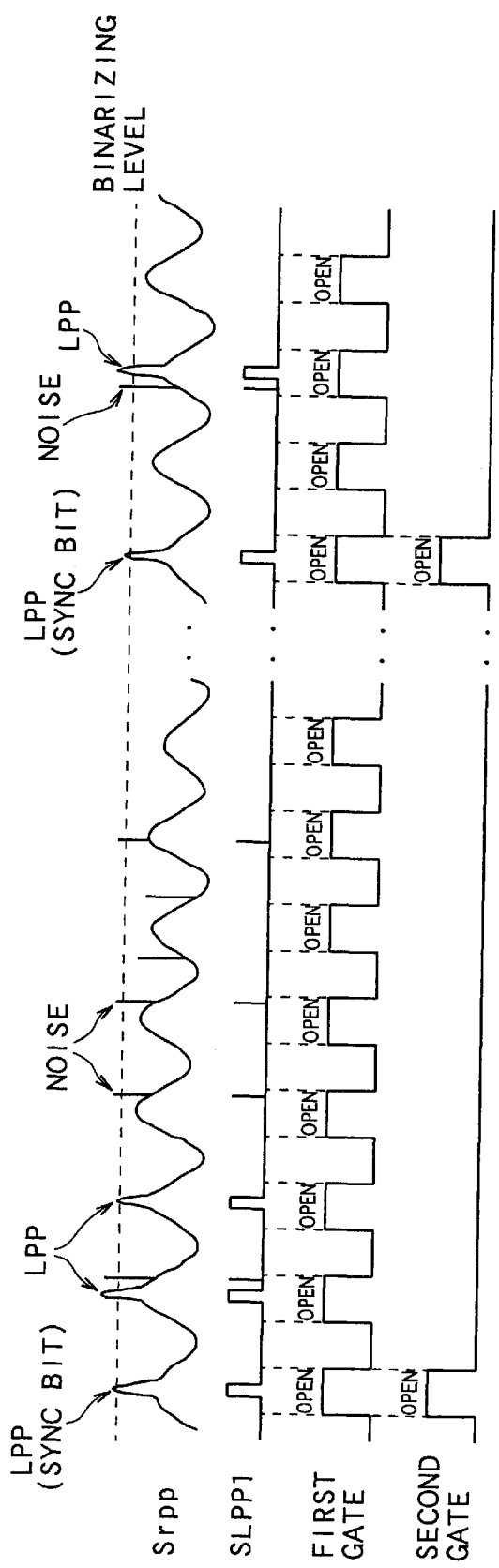
FIG. 4 is a timing chart showing the timings of openings and closing in a first gate 5a and second gate 5b, and of waveforms of various signals.

A memory section including ROM, RAM, etc., which is not described in the drawings, is connected to the CPU 6 through a bus. In the ROM, programs such as a program for setting an optimize binarizing level, etc., are stored. The RAM is mainly used for a working area. The CPU 6 functions as binarizing level setting means, counts the number of the LPP signals $S_{LPP1}$ passing through the first gate 5a to store the result of the counting in the RAM as a first count number. The CPU 6 also counts the number of the LPP signal $S_{LPP1}$ passing through the second gate 5b to store the result of the counting in the RAM as a second count number. Then, the CPU 6 adjusts the binarizing levels for address and for a clock based on the relationship between the first count number per reference time and the predetermined first reference number, the relationship between the second count number per reference time and the predetermined second reference number, or the combination between them. FIG. 4 is a timing chart showing timings of closing and opening of the first gate 5a and second gate 5b, and of various signal waveforms. As shown in FIG. 4, the only LPP signals $S_{LPP1}$ generated when the first gate 5a and second gate 5b are opened, pass through, so that they are counted by the CPU 6.

Next, the adjustment of initial binarizing levels for an address and a clock at the beginning of recording of record information on the DVD-R 50 will be described with reference to FIGS. 5 to 7.

(First Embodiment)

In the first embodiment, the adjustment of initial binarizing levels for an address and a clock in the case where the only first gate 5a is used will be described with reference to FIG. 5. FIG. 5 is a flowchart showing the processing in the CPU 6 when the initial binarizing levels for an address and a clock is adjusted at the beginning of recording of record information on the DVD-R 50.

Figure 5:
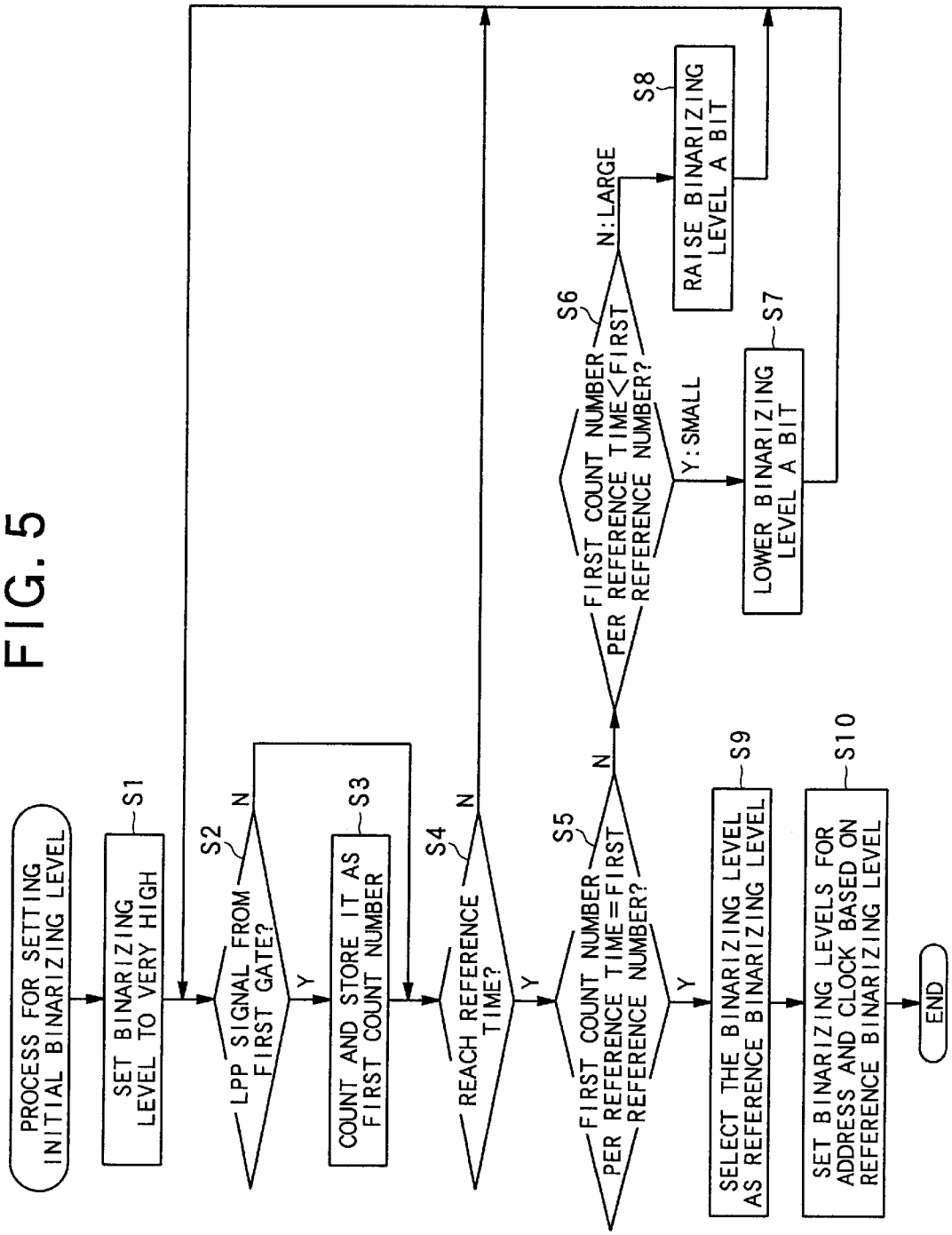
FIG. 5 is a flowchart showing the processing of CPU 6 for setting initial binarizing levels for an address and a clock at the beginning of recording of record information on the DVD-R 50 in a first embodiment.

As shown in FIG. 5, the CPU 6 sets the binarizing level to very high, and then supplies it to the address-LPP comparator 32 (step S1). At this time, the binarizing level is set to a higher level than the highest level of a maximum amplitude of the LPP signal components piggybacked onto the wobble signal. Namely, the binarizing level is set to one by which the LPP signal components are not binarized and, generated.

The CPU 6 determines whether the LPP signal $S_{LPP1}$ is supplied to from the first gate 5a or not (step S2). If the LPP signal $S_{LPP1}$ is supplied to, the CPU 6 counts it to store the counting result on the RAM as the first count number, whose initial value is zero (step S3). It is impossible to generate the LPP signal $S_{LPP1}$ by the binarizing level set in step S1, so that the first count number does not increase. If the number increases, it is conceivable that it is caused by noise components. Then, the CPU 6 performs the processing of step S2 and step S3 until it reaches a predetermined reference time (step S4). The reference time can be selected as an arbitrary time, for example, 5 msec.

In the case where it reaches the reference time in step S4, the CPU 6 compares the first count number per the reference time with the predetermined first reference number to determine whether they are equal or not (step S5). The first reference number is set to the number of the LPPs 104 which are contemplated to be formed on the maximum amplitude of the wobbling within the limits of the reference time. For example, in the case where the reference time is 5 msec, in the embodiment, since the sync frame has a wobbling frequency f0 of 140 kHz, it is mathematically presumed that approximately 70 pieces of LPPs 104 are formed, the first reference number is set to 70.

In step S5, in the case where it is determined that the first count number per the reference time is not equal to the predetermined first reference number, the CPU 6 determines the inequality between the first count number per the reference time and the first reference number, namely, determines whether the first count number per the reference time is smaller than the first reference number or not (step S6). If it is determined that the first count number per the reference time is smaller than the first reference number, the CPU 6 lowers the binarizing level a little bit (step S7), and supplies it to the address-LPP comparator 32. Then, the processing returns to step S2. At this time, the first count number is cleared.

Thus, the processing from step S2 to step S7 is repeatedly performed, so that the binarizing level is gradually decreased from a high level to a low level. Accordingly, the first count number is gradually increased, so that it approached the predetermined first reference number.

On the other hand, in step S6, in the case where it is determined that the first count number per the reference time is larger than the first reference number, namely, where the binarizing level is lowered too much by the CPU 6, the CPU 6 raises the binarizing level a little bit (step S8), and supplies it to the address-LPP comparator 32.

Thus, in step S5, the binarizing level is adjusted until the first count number per the reference time is equal to the predetermined first reference number. In the case where the first count number is equal to the predetermined first reference number, the CPU 6 sets the binarizing level to a reference binarizing level (step S9).

The CPU 6 sets the binarizing level for an address and a clock based on the set reference binarizing level (step S10), and supplies them to the address-LPP comparator 32 and the clock-LPP comparator 34. For example, the binarizing level for an address is set to a lower one than the reference binarizing level by a predetermined level. The binarizing level for a clock is set to a higher one than the reference binarizing level by a predetermined level.

Thus, according to the first embodiment, the binarizing level is set based on the relationship between the first count number per the reference time and the predetermined first reference number. Therefore, since it is possible to grasp whether the binarizing level is set to a higher one or lower one, it is possible to set the binarizing level to an optimum one immediately. Further, it is possible to discriminate between the binarizing level for generating an LPP signal, which is used for generating the address information and various timing signals, and the binarizing level for generating another LPP signal, which is used for generating a recording clock signal, so that it is possible to set optimum binarizing levels for generating respective LPP signals. However, it is possible to set the binarizing levels for an address and a clock so that both of them match the reference binarizing level.

In addition, in the steps S5, S6, the first count number per the reference time is compared with the first reference number. However, for another example, it is possible to compare the first count number per the reference time with a predetermined range including the first reference number. In this case, in step S5, it is determined whether the first count number per the reference time is within the predetermined range including the first reference number or not. In step S6, it is determined whether or not the first count number per the reference time is smaller or larger than the predetermined range including the first reference number. The predetermined range is set as, for example, a margin of plus or minus some pieces with a center of the first reference number. If the LPPs 104 are formed on the EVEN frame, for example, since the signal components of LPPs 104 do not always exist at the second or third position of the maximum amplitude from the top in the whole EVEN frames, the margin is set in consideration of this. In this case, it is possible to ensure a margin of safety for setting the binarizing level.

(Second Embodiment)

In the second embodiment, the adjustment of initial binarizing levels for an address and a clock in the case where the only second gate 5b is used will be described with reference to FIG. 6. FIG. 6 is a flowchart showing the processing in the CPU 6 when the initial binarizing levels for an address and a clock is adjusted at the beginning of recording of record information on the DVD-R 50.

Figure 6:
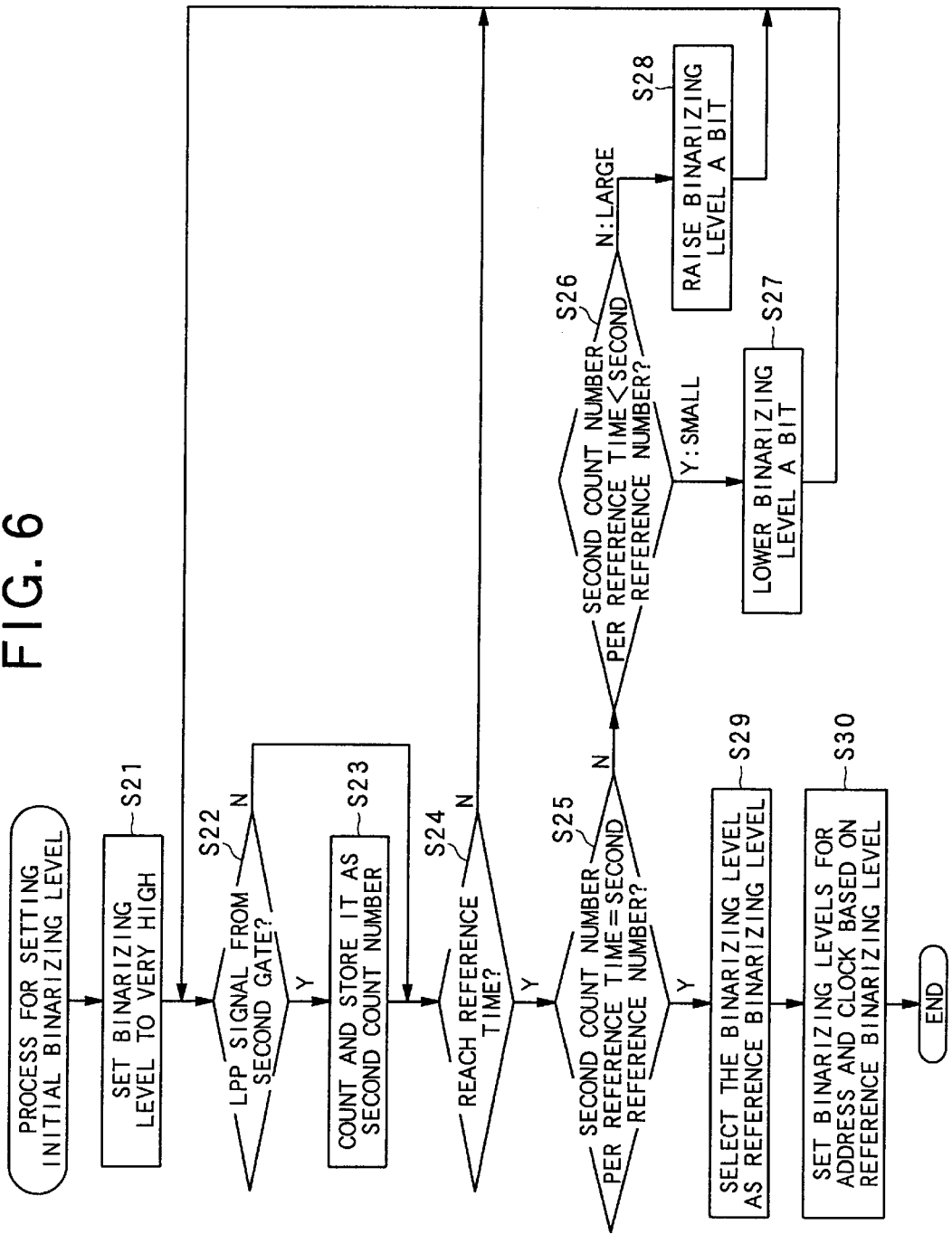
FIG. 6 is a flowchart showing the processing of CPU 6 for setting initial binarizing levels for an address and a clock at the beginning of recording of record information on the DVD-R 50 in a second embodiment.

As shown in FIG. 6, the CPU 6 sets the binarizing level to very high, and then supplies it to the address-LPP comparator 32 (step S21), as with step S1 shown in FIG. 5.

The CPU 6 determines whether the LPP signal $S_{LPP1}$ is supplied to from the second gate 5b or not (step S22). If the LPP signal $S_{LPP1}$ is supplied to, the CPU 6 counts it to store the counting result on the RAM as the second count number, whose initial value is zero (step S23). Then, the CPU 6 performs the processing of step S22 and step S23 until it reaches a predetermined reference time (step S24).

In the case where it reaches the reference time in step S24, the CPU 6 compare the second count number per the reference time with the predetermined second reference number to determine whether they are equal or not (step S25). The second reference number is set to the number of the LPPs 104 which are contemplated to be formed on the first maximum amplitude of each EVEN frame or ODD frame of the wobbling within the limits of the reference time. For example, in the case where the reference time is 5 msec, in the embodiment, since the sync frame has a wobbling frequency f0 of 140 kHz, it is mathematically presumed that approximately 44 pieces of LPPs 104 are formed, the second reference number is set to 44.

In step S25, in the case where it is determined that the second count number per the reference time is not equal to the predetermined second reference number, the CPU 6 determines the inequality between the second count number per the reference time and the second reference number, namely, determines whether the second count number per the reference time is smaller than the second reference number or not (step S26). If it is determined that the second count number per the reference time is smaller than the second reference number, the CPU 6 lowers the binarizing level a little bit (step S27), and supplies it to the address-LPP comparator 32. Then, the processing returns to step S22. At this time, the second count number is cleared.

Thus, the processing from step S22 to step S27 is repeatedly performed, so that the binarizing level is gradually decreased from a high level to a low level. Accordingly, the second count number is gradually increased, so that it approached the predetermined second reference number.

On the other hand, in step S26, in the case where it is determined that the second count number per the reference time is larger than the second reference number, namely, where the binarizing level is lowered too much by the CPU 6, the CPU 6 raises the binarizing level a little bit (step S28), and supplies it to the address-LPP comparator 32.

Thus, in step S25, the binarizing level is adjusted until the second count number per the reference time is equal to the predetermined second reference number. In the case where the second count number is equal to the predetermined second reference number, the CPU 6 sets the binarizing level to a reference binarizing level (step S29).

Step S30 is performed as with step S10 shown in FIG. 5, so that redundant description of it is eliminated.

Thus, according to the second embodiment, it is possible to obtain the same results as the first embodiment. In addition, since the second gate 5b is opened only in a period during which the amplitude of the wobbling invariably having the LPP signal components becomes a maximum one, in contrast to the first gate 5a, it is possible to count the LPP signals more precisely than the first embodiment. Therefore, it is possible to set the binarizing level to a more optimum (precise) one. Especially, the second embodiment becomes effective in the case where the initial binarizing level is set in a short period.

Further, it is possible to compare the second count number per the reference time with a predetermined range including the second reference number, as with step S5, S6 shown in FIG. 5.

(Third Embodiment)

In the third embodiment, the adjustment of initial binarizing levels for an address and a clock in the case where both the first gate 5a and second gate 5b are used will be described with reference to FIG. 7. FIG. 7 is a flowchart showing the processing in the CPU 6 when the initial binarizing levels for an address and a clock is adjusted at the beginning of recording of record information on the DVD-R 50.

Figure 7:
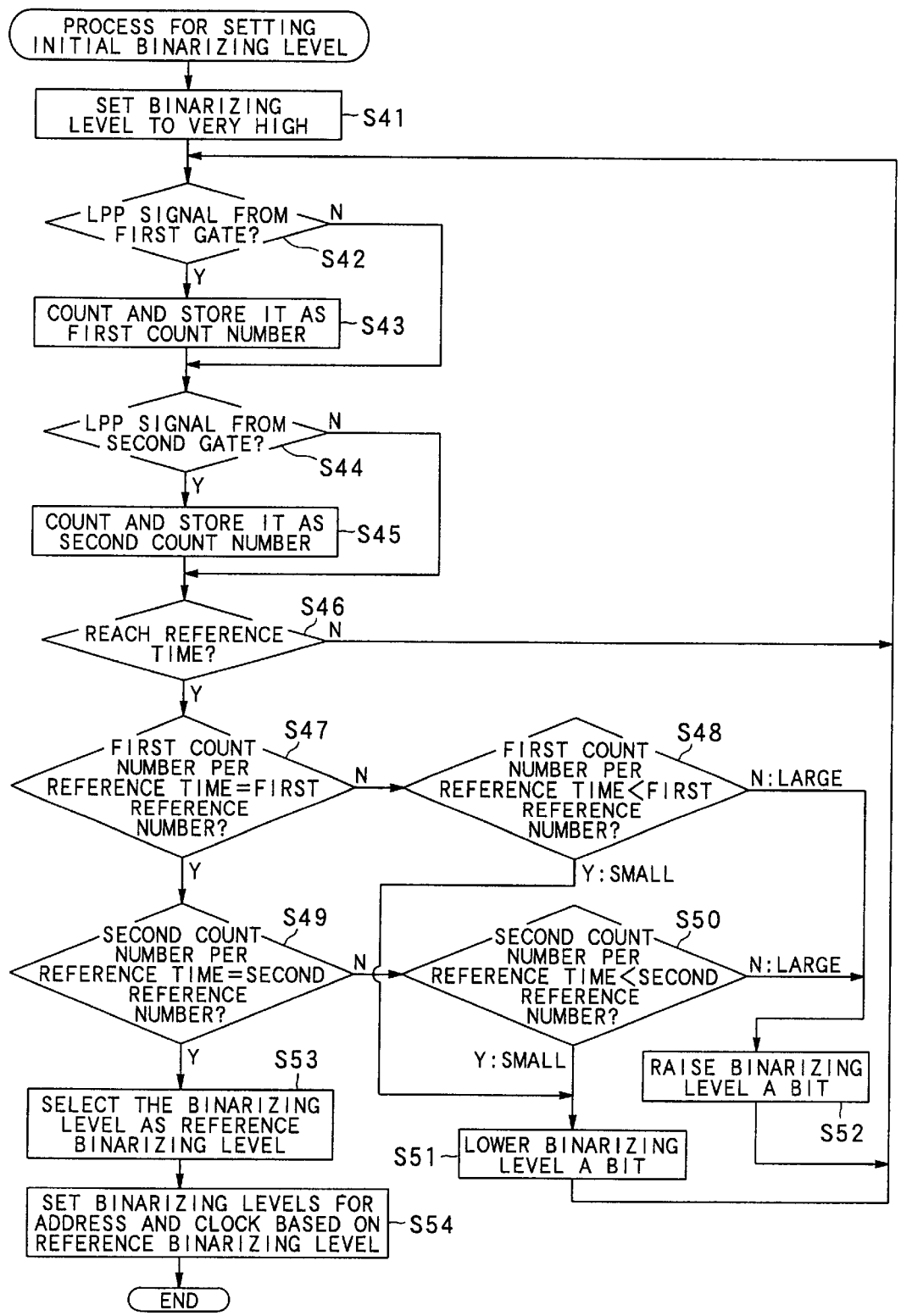
FIG. 7 is a flowchart showing the processing of CPU 6 for setting initial binarizing levels for an address and a clock at the beginning of recording of record information on the DVD-R 50 in a third embodiment.

As shown in FIG. 7, the CPU 6 sets the binarizing level to very high, and then supplies it to the address-LPP comparator 32 (step S41), as with step S1 shown in FIG. 5.

The CPU 6 determines whether the LPP signal $S_{LPP1}$ is supplied to from the first gate 5a or not (step S42). If the LPP signal $S_{LPP1}$ is supplied to, the CPU 6 counts it to store the counting result on the RAM as the first count number, whose initial value is zero (step S43). The CPU 6 also determines whether the LPP signal $S_{LPP1}$ is supplied to from the second gate 5b or not (step S44). If the LPP signal $S_{LPP1}$ is supplied to, the CPU 6 counts it to store the counting result on the RAM as the second count number, whose initial value is zero (step S45). Then, the CPU 6 performs the processing of step S42 and step S45 until it reaches a predetermined reference time (step S46). The reference time can be selected as with the first embodiment or second embodiment.

As described above, since the second gate 5b is opened after a lapse of a predetermined time from the start of closing and opening of the first gate 5a, the start of counting of the LPP signal $S_{LPP1}$ passed through the second gate 5b is delayed compared with the start of counting of the LPP signal $S_{LPP1}$ passed through the first gate 5a.

In the case where it reaches the reference time in step S46, the CPU 6 compares the first count number per the reference time with the predetermined first reference number to determine whether they are equal or not (step S47). The first reference number is set as with the first embodiment. In the case where it is determined that the first count number per the reference time is not equal to the predetermined first reference number, the CPU 6 determines the inequality between the first count number per the reference time and the first reference number, namely, determines whether the first count number per the reference time is smaller than the first reference number or not (step S48). If it is determined that the first count number per the reference time is smaller than the first reference number, the CPU 6 lowers the binarizing level a little bit (step S51), and supplies it to the address-LPP comparator 32. Then, the processing returns to step S42. At this time, the first count number and second count number are cleared.

Thus, the processing from step S42 to step S48 and step S51 is repeatedly performed, so that the binarizing level is gradually decreased from a high level to a low level. Accordingly, the first count number is gradually increased, so that it approached the predetermined first reference number. On the other hand, in step S48, in the case where it is determined that the first count number per the reference time is larger than the first reference number, namely, where the binarizing level is lowered too much by the CPU 6, the CPU 6 raises the binarizing level a little bit (step S52), and supplies it to the address-LPP comparator 32.

Thus, in step S47, the binarizing level is adjusted until the first count number per the reference time is equal to the predetermined first reference number. In the case where the first count number is equal to the predetermined first reference number, the processing moves to step S49.

In step S49, the CPU 6 compares the second count number per the reference time with the predetermined second reference number to determine whether they are equal or not. Namely, although approximate binarizing level is selected in the processing of step S47, since there is a high possibility that signals passed through the first gate 5a still includes a binarizing signal based on noise components (pseudo-LPP signal), it is noted that the binarizing level when the first count number per the reference time matches the predetermined first reference number is not necessarily optimum. Therefore, fine adjustments for the binarizing level will be made based on the number of the LPP signals $S_{LPP1}$ passed through the second gate 5b. The second reference number is set as with the second embodiment.

In step S49, in the case where it is determined that the second count number per the reference time is not equal to the predetermined second reference number, the CPU 6 determines the inequality between the second count number per the reference time and the second reference number, namely, determines whether the second count number per the reference time is smaller than the second reference number or not (step S50). If it is determined that the second count number per the reference time is smaller than the second reference number, the CPU 6 lowers the binarizing level a little bit (step S51), and supplies it to the address-LPP comparator 32. Then, the processing returns to step S42. On the other hand, if it is determined that the second count number per the reference time is larger than the second reference number, the CPU 6 raises the binarizing level a little bit (step S52), and supplies it to the address-LPP comparator 32. Then, the processing returns to step S42. At this time, the second count number is cleared.

Thus, the processing from step S42 to step S52 is repeatedly performed. In this case the processing of step S47 is skipped. Then, in step S49, fine adjustment of the binarizing level is made until the second count number per the reference time is equal to the second reference number. In the case where the second count number per the reference time is equal to the second reference number, the CPU 6 sets the binarizing level as a reference binarzing level (step S53).

Step S54 is performed as with step S10 shown in FIG. 5, so that redundant description of it is eliminated.

Thus, according to the third embodiment, it is possible to obtain the same results as the second embodiment. In addition, at the first step, the binarizing level is roughly adjusted based on the number of the LPP signals $S_{LPP1}$ passed through the first gate 5a. Then, at the final step, fine adjustment for the binarizing level can be made based on the number of the LPP signals $S_{LPP1}$ passed through the second gate 5b. Accordingly, it is possible to set an optimum binarizing level more immediately than the second embodiment.

Further, in steps S47, S48, S49, and S50, it is possible to compare the first count number per the reference time with a predetermined range including the first reference number, and compare the second count number per the reference time with a predetermined range including the second reference number, as with step S5, S6 shown in FIG. 5. Especially, if this applies to steps S47 and S48, it is determined that the first count number is included within the predetermined range including the first reference number in step S47, so that it is not necessary to skip step S47 as described above after the processing moves to step S49. Therefore, although it is conceivable that the binarizing level is lowered too much since the second gate 5b is opened less frequently than the first gate 5a and it is impossible to find a noise on the timing other than the second gate 5b is opened, it is possible to prevent the binarizing level based on the number of the LPP signals passed through the second gate 5b from being lowered too much.

Further, in step S45, in the case where the second count number is increased, it is possible to skip the processing of step S47 and move to step S49. In this case, it is possible to set an optimum biarizing level more immediately.

Next, the adjustment of binarizing levels for an address and a clock during recording of record information on the DVD-R 50, namely, after the binarizing levels are set in any one of the first, second, and third embodiment, will be described with reference to FIGS. 8 to 10.

(Fourth Embodiment)

In the fourth embodiment, the adjustment of binarizing levels for an address and a clock in the case where the only first gate 5a is used will be described with reference to FIG. 8. FIG. 8 is a flowchart showing the processing in the CPU 6 when the binarizing levels for an address and a clock are adjusted during recording of record information on the DVD-R 50.

Figure 8:
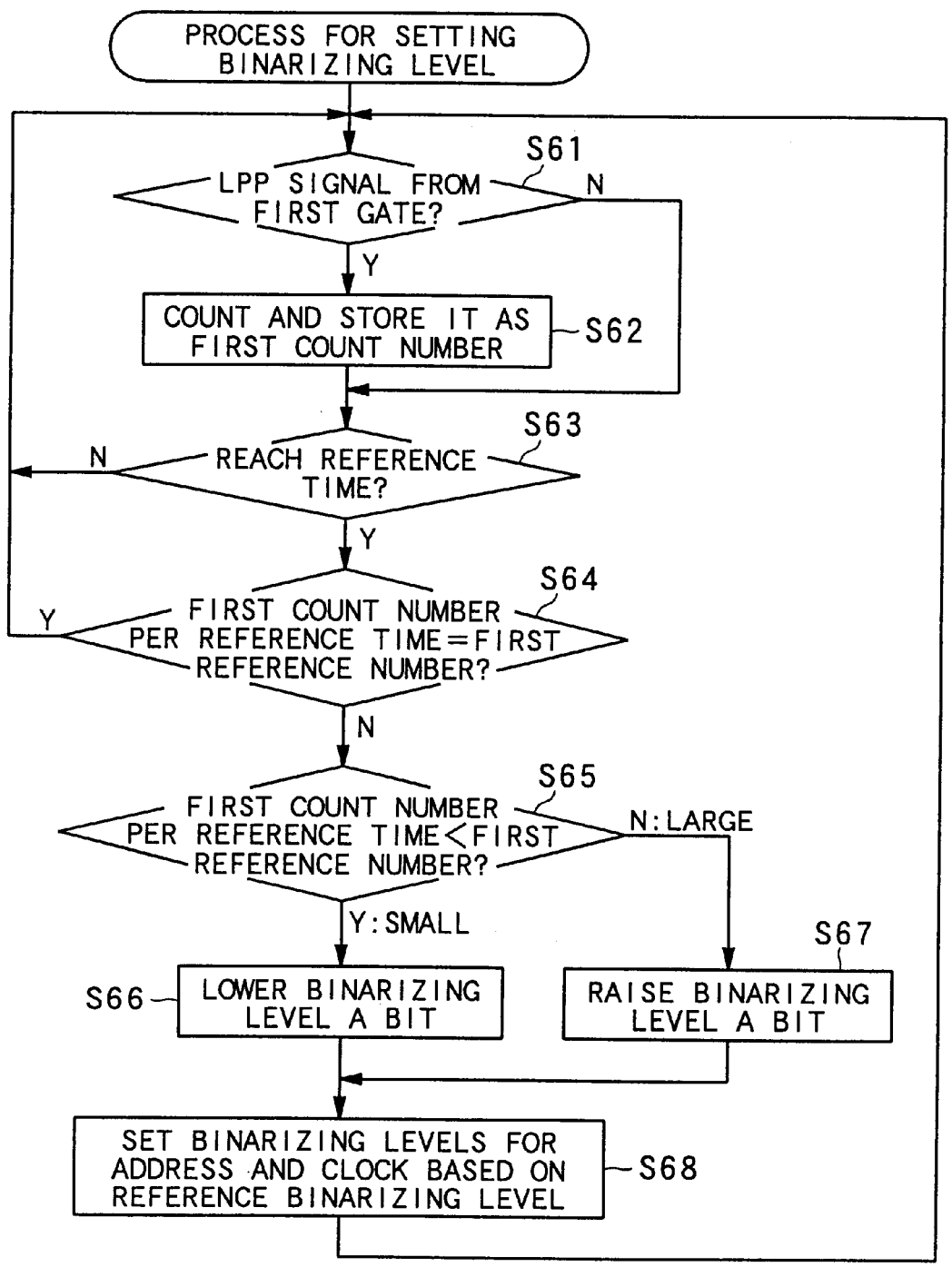
FIG. 8 is a flowchart showing the processing of CPU 6 for setting initial binarizing levels for an address and a clock during recording of record information on the DVD-R 50 in a fourth embodiment.

As shown in FIG. 8, the CPU 6 determines whether the LPP signal $S_{LPP1}$ is supplied to from the first gate 5a or not (step S61). If the LPP signal $S_{LPP1}$ is supplied to, the CPU 6 counts it to store the counting result on the RAM as the first count number, whose initial value is zero (step S62). Then, the CPU 6 performs the processing of step S61 and step S62 until it reaches a predetermined reference time (step S63). The reference time can be selected as with the first, second, and third embodiments.

In the case where it reaches the reference time in step S63, the CPU 6 compares the first count number per the reference time with the predetermined first reference number to determine whether they are equal or not (step S64). The first reference number is set as with the first embodiment.

In the case where it is determined that the first count number per the reference time is equal to the predetermined first reference number, maintaining the present reference binarizing level, the processing from step S61 to step S64 is repeatedly performed. On the other hand, in the case where it is determined that the first count number per the reference time is not equal to the predetermined first reference number, the CPU 6 determines the inequality between the first count number per the reference time and the first reference number, namely, determines whether the first count number per the reference time is smaller than the first reference number or not (step S65).

If it is determined that the first count number per the reference time is smaller than the first reference number, the CPU 6 lowers the reference binarizing level a little bit (step S66), and based on this, the binarizing levels for an address and a clock are re-adjusted (step S68). For example, the binarizing levels for an address and a clock are lowered to an extent that the reference binarizing level is lowered. Then, the CPU 6 supplies them to the address-LPP comparator 32 and the clock-LPP comparator 34.

If it is determined that the first count number per the reference time is larger than the first reference number in step S65, the CPU 6 raises the reference binarizing level a little bit (step S67), and based on this, the binarizing levels for an address and a clock are re-adjusted (step S68). For example, the binarizing levels for an address and a clock are raised to an extent that the reference binarizing level is raised. Then, the CPU 6 supplies them to the address-LPP comparator 32 and the clock-LPP comparator 34.

Thus, according to the fourth embodiment, it is possible to maintain the optimum binarizing levels set in the first embodiment and second embodiment. Namely, since the binarizing levels are selected based on the relationship between the first count number per the reference time and the first reference number, it is possible to grasp whether the binarizing levels are set to higher ones or lower ones. As a result, it is possible to set the binarizing levels to optimum ones immediately.

In steps S64, S65, it is possible to compare the first count number per the reference time with the predetermined range including the first reference number, as with steps S5, S6 shown in FIG. 5.

(Fifth Embodiment)

In the fifth embodiment, the adjustments of binarizing levels for an address and a clock in the case where the only second gate 5*b* is used will be described with reference to FIG. 9. FIG. 9 is a flowchart showing the processing in the CPU 6 when the binarizing levels for an address and a clock are adjusted during recording of record information on the DVD-R 50.

Figure 9:
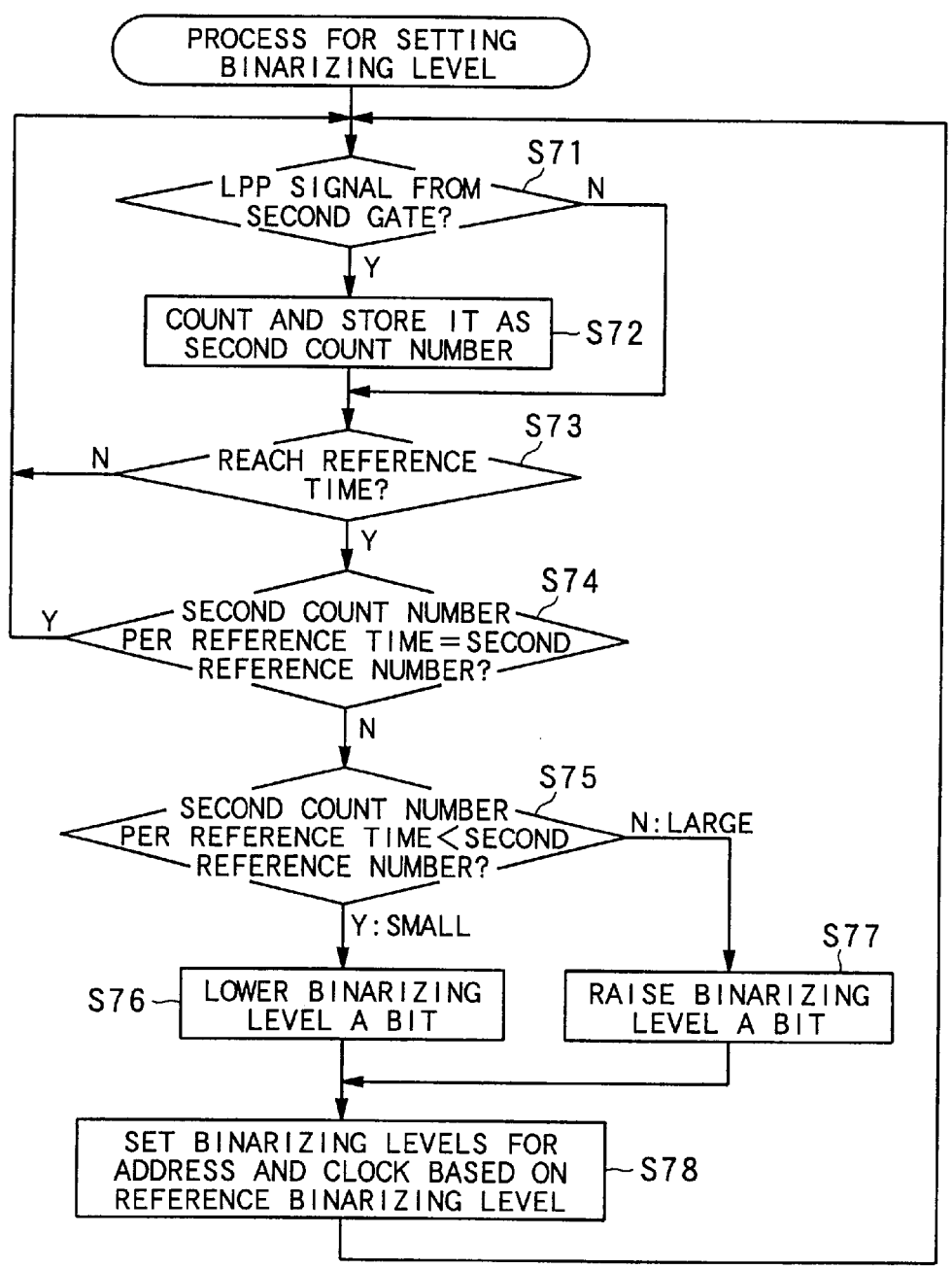
FIG. 9 is a flowchart showing the processing of CPU 6 for setting initial binarizing levels for an address and a clock during recording of record information on the DVD-R 50 in a fifth embodiment.

As shown in FIG. 9, the CPU 6 determines whether the LPP signal $S_{LPP1}$ is supplied to from the second gate 5*b* or not (step S71). If the LPP signal $S_{LPP1}$ is supplied to, the CPU 6 counts it to store the counting result on the RAM as the second count number, whose initial value is zero (step S72). Then, the CPU 6 performs the processing of step S71 and step S72 until it reaches a predetermined reference time (step S73). The reference time can be selected as with the first, second, and third embodiments.

In the case where it reaches the reference time in step S73, the CPU 6 compares the second count number per the reference time with the predetermined second reference number to determine whether they are equal or not (step S74). The second reference number is set as with the second embodiment.

In the case where it is determined that the second count number per the reference time is equal to the predetermined second reference number in step S74, maintaining the present reference binarizing level, the processing from step S71 to step S74 is repeatedly performed. On the other hand, in the case where it is determined that the second count number per the reference time is not equal to the predetermined second reference number, the CPU 6 determines the inequality between the second count number per the reference time and the second reference number, namely, determines whether the second count number per the reference time is smaller than the second reference number or not (step S75).

If it is determined that the second count number per the reference time is smaller than the second reference number, the CPU 6 lowers the reference binarizing level a little bit (step S76), and based on this, the binarizing levels for an address and a clock are re-adjusted (step S78). For example, the binarizing levels for an address and a clock are lowered to an extent that the reference binarizing level is lowered. Then, the CPU 6 supplies them to the address-LPP comparator 32 and the clock-LPP comparator 34.

If it is determined that the second count number per the reference time is larger than the second reference number in step S75, the CPU 6 raises the reference binarizing level a little bit (step S77), and based on this, the binarizing levels for an address and a clock are re-adjusted (step S78). For example, the binarizing levels for an address and a clock are raised to an extent that the reference binarizing level is raised. Then, the CPU 6 supplies them to the address-LPP comparator 32 and the clock-LPP comparator 34.

Thus, according to the fifth embodiment, it is possible to obtain the same results as the fourth embodiment. In addition, since the second gate 5*b* is always opened only in a period during which the amplitude of the wobbling having the LPP signal components becomes a maximum one, in contrast to the first gate 5*a*, it is possible to count the LPP signals more precisely than the fourth embodiment. Therefore, it is possible to set the binarizing level to a more optimum (precise) one.

In steps S74, S75, it is possible to compare the second count number per the reference time with the predetermined range including the second reference number, as with steps S5, S6 shown in FIG. 5.

(Sixth Embodiment)

In the sixth embodiment, the adjustments of binarizing levels for an address and a clock in the case where both the first gate 5*a* and second gate 5*b* are used will be described with reference to FIG. 10. FIG. 10 is a flowchart showing the processing in the CPU 6 when the binarizing levels for an address and a clock are adjusted during recording of record information on the DVD-R 50.

Figure 10:
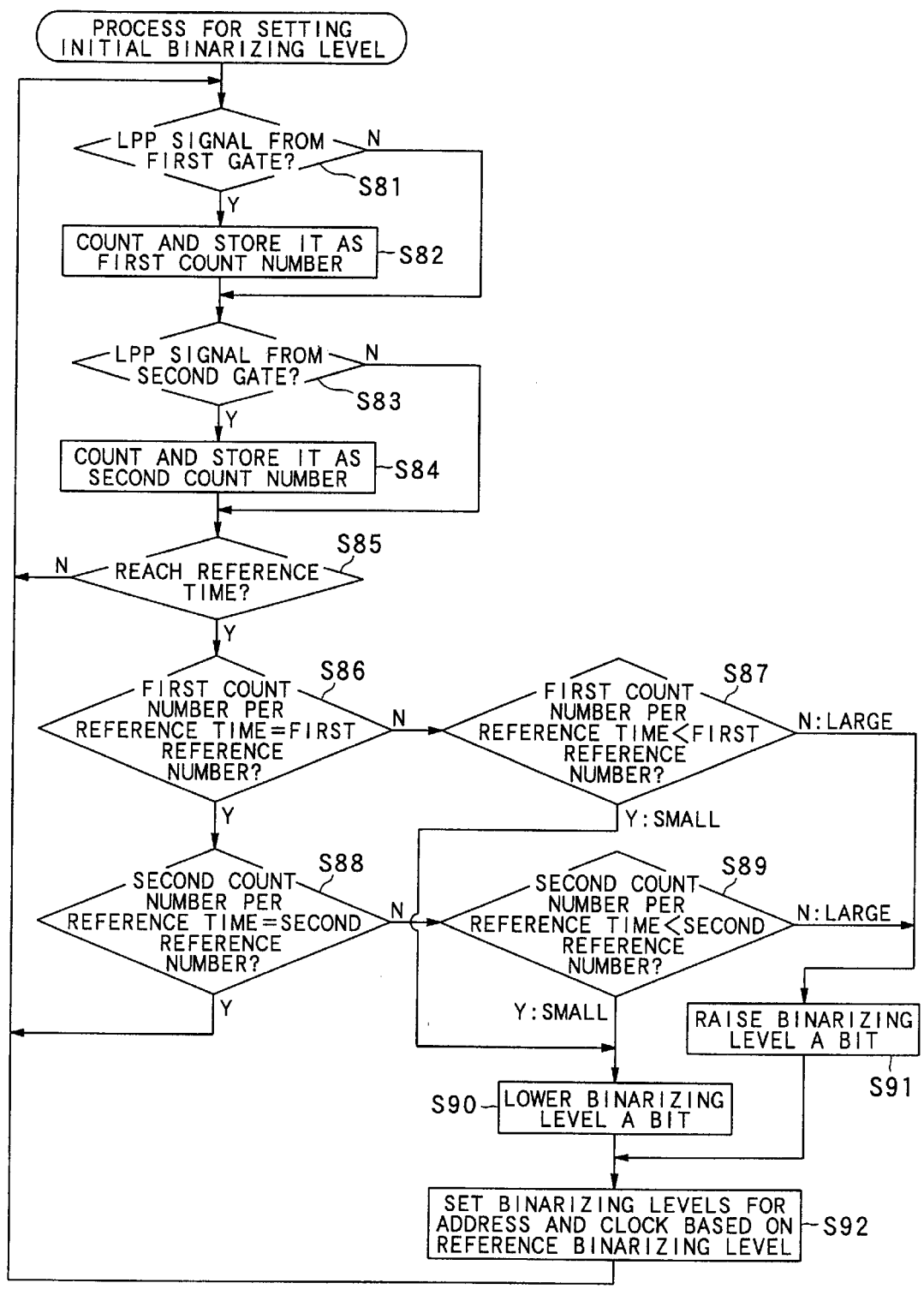
FIG. 10 is a flowchart showing the processing of CPU 6 for setting initial binarizing levels for an address and a clock during recording of record information on the DVD-R 50 in a fifth embodiment.

As shown in FIG. 10, the CPU 6 determines whether the LPP signal $S_{LPP1}$ is supplied to from the first gate 5*a* or not (step S81). If the LPP signal $S_{LPP1}$ is supplied to, the CPU 6 counts it to store the counting result on the RAM as the first count number, whose initial value is zero (step S82). Further, the CPU 6 determines whether the LPP signal $S_{LPP1}$ is supplied to from the second gate 5*b* or not (step S83). If the LPP signal $S_{LPP1}$ is supplied to, the CPU 6 counts it to store the counting result on the RAM as the second count number, whose initial value is zero (step S84).

Then, the CPU 6 performs the processing of step S81 and step S84 until it reaches a predetermined reference time (step S85). The reference time can be selected as with the first, second, and third embodiments.

In the case where it reaches the reference time, the CPU 6 compares the second count number per the reference time with the predetermined second reference number to determine whether they are equal or not (step S86). On the other hand, in the case where it is determined that the first count number per the reference time is not equal to the predetermined first reference number, the CPU 6 determines the inequality between the first count number per the reference time and the first reference number, namely, determines whether the first count number per the reference time is smaller than the first reference number or not (step S87). The first reference number is set as with the first embodiment.

If it is determined that the first count number per the reference time is smaller than the first reference number, the CPU 6 lowers the reference binarizing level a little bit (step S90), and based on this, the binarizing levels for an address and a clock are re-adjusted (step S92). For example, the binarizing levels for an address and a clock are lowered to an extent that the reference binarizing level is lowered. Then, the CPU 6 supplies them to the address-LPP comparator 32 and the clock-LPP comparator 34. At this time, the first counter number and second counter number are cleared.

If it is determined that the first count number per the reference time is larger than the first reference number in step S87, the CPU 6 raises the reference binarizing level a little bit (step S91), and based on this, the binarizing levels for an address and a clock are re-adjusted (step S92). For example, the binarizing levels for an address and a clock are raised to an extent that the reference binarizing level is raised. Then, the CPU 6 supplies them to the address-LPP comparator 32 and the clock-LPP comparator 34. At this time, the first counter number and second counter number are cleared.

In step S88, the CPU 6 compares the second count number per the reference time with the predetermined second reference number to determine whether they are equal or not. Namely, as with the third embodiment, fine adjustments for the binarizing levels are made at two stages, i.e., the first gate 5a and the second gate 5b.

In the case where it is determined that the second count number per the reference time is equal to the predetermined second reference number in step S88, the processing from step S81 to step S84 is repeatedly performed. On the other hand, in the case where it is determined that the second count number per the reference time is not equal to the predetermined second reference number, the CPU 6 determines the inequality between the second count number per the reference time and the second reference number, namely, determines whether the second count number per the reference time is smaller than the second reference number or not (step S89).

If it is determined that the second count number per the reference time is smaller than the second reference number, the CPU 6 lowers the reference binarizing level a little bit (step S90), and based on this, the binarizing levels for an address and a clock are re-adjusted (step S92). For example, the binarizing levels for an address and a clock are lowered to an extent that the reference binarizing level is lowered. Then, the CPU 6 supplies them to the address-LPP comparator 32 and the clock-LPP comparator 34.

On the other hand, if it is determined that the second count number per the reference time is larger than the second reference number in step S89, the CPU 6 raises the reference binarizing level a little bit (step S91), and based on this, the binarizing levels for an address and a clock are re-adjusted (step S92). For example, the binarizing levels for an address and a clock are raised to an extent that the reference binarizing level is raised. Then, the CPU 6 supplies them to the address-LPP comparator 32 and the clock-LPP comparator 34.

Thus, according to the sixth embodiment, it is possible to obtain the same results as the fifth embodiment. In addition, it is possible to obtain the same results as the third embodiment.

Further, in steps S86, S87, S88, and S89, it is possible to compare the first count number per the reference time with a predetermined range including the first reference number, and compare the second count number per the reference time with a predetermined range including the second reference number, as with step S5, S6 shown in FIG. 5. Especially, if this applies to steps S86 and S87, it is determined that the first count number is included within the predetermined range including the first reference number in step S86, it is possible to prevent the binarizing level based on the number of the LPP signals passed through the second gate 5b from being lowered too much after the processing moves to step S88.

Moreover, in the first, second, and third embodiments, the adjustments of the initial binarizing levels for an address and a clock at the beginning of recording of record information on the DVD-R 50 are described. These embodiments can be applied not only to a case where record information is newly recorded on the DVD-R 50 on which no information is recorded, but also to a case where record information is added to the DVD-R 50 on which information is partly recorded.

In the case where record information is added to the DVD-R 50 on which information is partly recorded, it is necessary to detect a recording start timing by tracing (reproducing) an end portion of the area where information is already recorded. Therefore, it is possible to perform the processing for setting the binarizing levels described in the first, second, and third embodiments at the time of tracing (reproducing). In this case, it is possible to record information so that address information included in the recorded information meets a predetermined relationship with respect to an address indicated by the pre-pits formed on the DVD-R 50. As a result, for example, it is possible to maintain the proper relationship of phases between a synchronizing signal of the recorded information and that of the added information.

In the first, second, and third embodiments, the adjustments of the initial binarizing levels for an address and a clock at the beginning of recording of record information on the DVD-R 50 are described. However, the present invention is not limited to these embodiments. It is possible to perform the processing for setting the binarizing levels described in first, second, and third embodiments even when record information is reproduced from the DVD-R 50.

In the fourth, fifth, and sixth embodiments, the adjustments of the initial binarizing levels for an address and a clock during recording of record information on the DVD-R 50 are described. However, the present invention is not limited to these embodiments. It is possible to apply the processing for setting the binarizing levels described in fourth, fifth, and sixth embodiments even to a case where record information is reproduced from the DVD-R 50. In this case, it is possible to continuously adjust the binarizing levels.

Further, in the first, third, fourth, sixth embodiments, the first gate 5a included in the decoder 5 is periodically opened in a predetermined period during which the wobbling becomes a maximum one in order to prevent noise components from being passed through as much as possible. For example, in the case where there is no noise component or are few noise components, it is possible to open the first gate 5a in all of the periods. Namely, it is unnecessary to mask periods other than a predetermined period where the amplitude of the wobbling becomes a maximum one as the first, third, fourth, sixth embodiments. Therefore, if the first gate 5a periodically opened is eliminated, it is possible to obtain the same results as the first to sixth embodiments.

Further, in the first to sixth embodiments, the CPU 6 counts the entire number of the LPP signals $S_{LPP1}$ passed through the first gate 5a and second gate 5b included in the decoder 5. A plurality of proper LPP signals $S_{LPP1}$ are not generated in each predetermined period during which a gate is periodically opened, i.e., in each period when the first gate 5a or the second gate 5b is opened. Therefore, in the case where a plurality of LPP signals $S_{LPP1}$ pass through in each predetermined period when gate is periodically opened, it is possible to count them as one.

For example, after the CPU 6 detects one LPP signal $S_{LPP1}$ in each predetermined period and counts it, even if the CPU 6 detects another LPP signal $S_{LPP1}$ in the same predetermined period, the CPU 6 does not count another LPP signal $S_{LPP1}$. As another example, a flip-flop, which is switched by the LPP signal $S_{LPP1}$, is inserted between the decoder 5 and CPU 6. The CPU 6 counts the output from the flip-flop, which is obtained when it is switched by the LPP signal $S_{LPP1}$, and resets the flip-flop every time each predetermined period is terminated. In this case, even if there is a pseudo-LPP signal due to noise components passed through the first gate 5a or the second gate 5b, it is possible to count the LPP signal $S_{LPP1}$ precisely. Therefore, it is possible to make the binarizing levels converge to proper ones more immediately.

In the embodiments, the present invention is applied to a DVD-R, for example, it is not limited to the embodiments. The present invention can be applied to another recording medium such as a DVD-RW, etc.

The invention may be embodied in other specific forms without departing from the spirit or essential characteristics thereof. The present embodiments are therefore to be considered in all respects as illustrative and not restrictive, the scope of the invention being indicated by the appended claims rather than by the forgoing description and all changes which come within the meaning and range of equivalency of the claims are therefore intended to be embraces therein.

The entire disclosures of Japanese Patent Applications No. 2001-286949 filed on Sep. 20, 2001 and No. 2001-6568 filed on Jan. 15, 2001 including the specification, claims, drawings and summary is incorporated herein by reference in its entirety.

What is claimed is:

1. A pre-pit detecting apparatus for extracting a composite signal from an optical recording medium and binarizing the composite signal to generate a pre-pit signal, said optical recording medium having an information recording track wobbled at a predetermined frequency and pre-pits formed at a predetermined spacing on a guide track adjacent to the information recording track, said composite signal in which pre-pit signal components are superimposed on components of frequency of the wobbling, said apparatus comprising:

a binarizing level setting device for setting a binarizing level for the composite signal;

a pre-pit signal generating device for comparing the extracted composite signal with the set binarizing level to generate a pre-pit signal; and a first gate for periodically opening its gate only in a period during which the amplitude of the wobbling becomes a maximum one to make the generated pre-pit signal pass through the gate, wherein the binarizing level setting device counts the number of the pre-pit signals passing through the first gate and sets the binarizing level based on the relationship between the counted number per a reference time and a predetermined reference number.

2. A pre-pit detecting apparatus for extracting a composite signal from an optical recording medium and binarizing the composite signal to generate a pre-pit signal, said optical recording medium having an information recording track wobbled at a predetermined frequency and pre-pits formed at a predetermined spacing on a guide track adjacent to the information recording track, said composite signal in which pre-pit signal components are superimposed on components of frequency of the wobbling, said apparatus comprising:

a binarizing level setting device for setting a binarizing level for the composite signal;

a pre-pit signal generating device for comparing the extracted composite signal with the set binarizing level to generate a pre-pit signal; and a second gate for periodically opening its gate only in a period during which a sync bit is superimposed on the wobbling and the amplitude of the wobbling becomes a maximum one to make the generated pre-pit signal pass through the gate, wherein the binarizing level setting device counts the number of the pre-pit signals passing through the second gate and sets the binarizing level based on the relationship between the counted number per a reference time and a predetermined reference number.

3. The pre-pit detecting device according to claim 1, wherein the binarizing level setting device compares the counted number per the reference time with the predetermined reference number, and sets the binarizing level based on the results of comparing.

4. The pre-pit detecting device according to claim 3, wherein the binarizing level setting device raises the binarizing level in the case where the counted number per the reference time is larger than the predetermined reference number, and lowers the binarizing level in the case where the counted number per the reference time is smaller than the predetermined reference number.

5. The pre-pit detecting device according to claim 1, wherein the binarizing level setting device compares the counted number per the reference time with a predetermined range including the predetermined reference number, and sets the binarizing level based on the results of comparing.

6. The pre-pit detecting device according to claim 5, wherein the
binarizing level setting device raises the binarizing level in the case where the counted number per the reference time is larger than the predetermined range, and lowers the binarizing level in the case where the counted number per the reference time is smaller than the predetermined range.

7. A pre-pit detecting apparatus for extracting a composite signal from an optical recording medium and binarizing the composite signal to generate a pre-pit signal, said optical recording medium having an information recording track wobbled at a predetermined frequency and pre-pits formed at a predetermined spacing on a guide track adjacent to the information recording track, said composite signal in which pre-pit signal components are superimposed on components of frequency of the wobbling, said apparatus comprising:

a binarizing level setting device for setting a binarizing level for the composite signal;

a pre-pit signal generating device for comparing the extracted composite signal with the set binarizing level to generate a pre-pit signal;

a first gate for periodically opening its gate only in a period during which the amplitude of the wobbling becomes a maximum one to make the generated pre-pit signal pass through the gate; and a second gate for periodically opening its gate only in a period during which a sync bit is superimposed on the wobbling and the amplitude of the wobbling becomes a maximum one to make the generated pre-pit signal pass through the gate, wherein the binarizing level setting device counts the number of the pre-pit signals passing through the first gate and the second gate respectively, and sets the binarizing level based on both the relationship between the number of the pre-pit signals passing through the first gate per a reference time and a predetermined first reference number, and the relationship between the number of the pre-pit signals passing through the second gate per a reference time and a predetermined second reference number.

8. A pre-pit detecting apparatus for extracting a composite signal from an optical recording medium and binarizing the composite signal to generate a pre-pit signal, said optical recording medium having an information recording track wobbled at a predetermined frequency and pre-pits formed at a predetermined spacing on a guide track adjacent to the information recording track, said composite signal in which pre-pit signal components are superimposed on components of frequency of the wobbling, said apparatus comprising:

a binarizing level setting device for setting a binarizing level for the composite signal;

a pre-pit signal generating device for comparing the extracted composite signal with the set binarizing level to generate a pre-pit signal; and a first gate for periodically opening its gate only in a period during which the amplitude of the wobbling becomes a maximum one to make the generated pre-pit signal pass through the gate, wherein the binarizing level setting device gradually lowers the binarizing level from a high level to a low level, and counts the number of the pre-pit signals passing through the first gate during a reference time in each level and sets a level where the counted number per the reference time becomes within a predetermined range including the predetermined reference number as a reference binarizing level.

9. A pre-pit detecting apparatus for extracting a composite signal from an optical recording medium and binarizing the composite signal to generate a pre-pit signal, said optical recording medium having an information recording track wobbled at a predetermined frequency and pre-pits formed at a predetermined spacing on a guide track adjacent to the information recording track, said composite signal in which pre-pit signal components are superimposed on components of frequency of the wobbling, said apparatus comprising:

a binarizing level setting device for setting a binarizing level for the composite signal;

a pre-pit signal generating device for comparing the extracted composite signal with the set binarizing level to generate a pre-pit signal; and a second gate for periodically opening its gate only in a period during which a sync bit is superimposed on the wobbling and the amplitude of the wobbling becomes a maximum one to make the generated pre-pit signal pass through the gate, wherein the binarizing level setting device gradually lowers the binarizing level from a high level to a low level, and counts the number of the pre-pit signals passing through the second gate during a reference time in each level and sets a level where the counted number per the reference time becomes within a predetermined range including the predetermined reference number as a reference binarizing level.

10. The pre-pit detecting device according to claim 8, wherein the binarizing level setting device, after setting the reference binarizing level, raises the reference binarizing level in the case where the counted number per the reference time is larger than a predetermined range including the predetermined reference number, and lowers the reference binarizing level in the case where the counted number is smaller than the predetermined range.

11. A pre-pit detecting apparatus for extracting a composite signal from an optical recording medium and binarizing the composite signal to generate a pre-pit signal, said optical recording medium having an information recording track wobbled at a predetermined frequency and pre-pits formed at a predetermined spacing on a guide track adjacent to the information recording track, said composite signal in which pre-pit signal components are superimposed on components of frequency of the wobbling, said apparatus comprising:

a binarizing level setting device for setting a binarizing level for the pre-pit signal for extracting at least address information as a binarizing level for an address, and for setting a binarizing level for the pre-pit signal for extracting at least a recording/reproducing clock as a binarizing level for a clock;

a first pre-pit signal generating device for comparing the extracted composite signal with the set binarizing level for an address to generate a pre-pit signal for an address;

a second pre-pit signal generating device for comparing the extracted composite signal with the set binarizing level for a clock to generate a pre-pit signal for a clock; and a first gate for periodically opening its gate only in a period during which the amplitude of the wobbling becomes a maximum one to make at least one pre-pit signal of the generated pre-pit signals pass through the gate, wherein the binarizing level setting devices gradually lower the respective binarizing levels from a high level to a low level, and count the number of the pre-pit signals passing through the first gate during a reference time in each level, and set a level where the counted number per the reference time becomes within a predetermined range including the predetermined reference number as a reference binarizing level, and sets the binarizing level for an address to a lower level than the reference binarizing level, and sets the binarizing level for a clock to a higher level than the reference binarizing level.

12. A pre-pit detecting apparatus for extracting a composite signal from an optical recording medium and binarizing the composite signal to generate a pre-pit signal, said optical recording medium having an information recording track wobbled at a predetermined frequency and pre-pits formed at a predetermined spacing on a guide track adjacent to the information recording track, said composite signal in which pre-pit signal components are superimposed on components of frequency of the wobbling, said apparatus comprising:

a binarizing level setting device for setting a binarizing level for the pre-pit signal for extracting at least address information as a binarizing level for an address, and for setting a binarizing level for the pre-pit signal for extracting at least a recording/reproducing clock as a binarizing level for a clock;

a first pre-pit signal generating device for comparing the extracted composite signal with the set binarizing level for an address to generate a pre-pit signal for an address;

a second pre-pit signal generating device for comparing the extracted composite signal with the set binarizing level for a clock to generate a pre-pit signal for a clock; and a second gate for periodically opening its gate only in a period during which a sync bit is superimposed on the wobbling and the amplitude of the wobbling becomes a maximum one to make the generated pre-pit signal pass through the gate, wherein the binarizing level setting devices gradually lower the respective binarizing levels from a high level to a low level, and count the number of the pre-pit signals passing through the second gate during a reference time in each level, and set a level where the counted number per the reference time becomes within a predetermined range including the predetermined reference number as a reference binarizing level, and sets the binarizing level for an address to a lower level than the reference binarizing level, and sets the binarizing level for a clock to a higher level than the reference binarizing level.

13. The pre-pit detecting device according to claim 11, wherein the binarizing level setting device, after setting the binarizing levels, raises the reference binarizing level, the binarizing level for an address, and the binarizing level for a clock in the case where the counted number per the reference time is larger than the predetermined range including the predetermined reference number, and lowers the reference binarizing level, the binarizing level for an address, and the binarizing level for a clock in the case where the counted number is smaller than the predetermined range.

14. A binarizing level setting method for setting a binarizing level for binarizing a composite signal extracted from an optical recording medium to generate a pre-pit signal, said optical recording medium having an information recording track wobbled at a predetermined frequency and pre-pits formed at a predetermined spacing on a guide track adjacent to the information recording track, said composite signal in which pre-pit signal components are superimposed on components of frequency of the wobbling, said method comprising the processes of:

provisionally setting a binarizing level for the composite signal;

comparing the extracted composite signal with the set binarizing level;

generating a pre-pit signal based on the results of comparing;

counting the number of the pre-pit signals passing through a first gate during a reference time, said first gate periodically opening its gate only in a period during which the amplitude of the wobbling becomes a maximum one to make the generated pre-pit signal pass through the gate; and setting the binarizing level based on the relationship between the counted number per the reference time and a predetermined reference number.

15. A binarizing level setting method for setting a binarizing level for binarizing a composite signal extracted from an optical recording medium to generate a pre-pit signal, said optical recording medium having an information recording track wobbled at a predetermined frequency and pre-pits formed at a predetermined spacing on a guide track adjacent to the information recording track, said composite signal in which pre-pit signal components are superimposed on components of frequency of the wobbling, said method comprising the processes of:

provisionally setting a binarizing level for the composite signal;

comparing the extracted composite signal with the set binarizing level;

generating a pre-pit signal based on the results of comparing;

counting the number of the pre-pit signals passing through a second gate during a reference time, said second gate periodically opening its gate only in a period during which a sync bit is superimposed on the wobbling and the amplitude of the wobbling becomes a maximum one to make the generated pre-pit signal pass through the gate; and setting the binarizing level based on the relationship between the counted number per the reference time and a predetermined reference number.

16. A binarizing level setting method for setting a binarizing level for binarizing a composite signal extracted from an optical recording medium to generate a pre-pit signal, said optical recording medium having an information recording track wobbled at a predetermined frequency and pre-pits formed at a predetermined spacing on a guide track adjacent to the information recording track, said composite signal in which pre-pit signal components are superimposed on components of frequency of the wobbling, said method comprising the processes of:

provisionally setting a binarizing level for the composite signal;

comparing the extracted composite signal with the set binarizing level;

generating a pre-pit signal based on the results of comparing;

counting the number of the pre-pit signals passing through a first gate during a reference time, said first gate periodically opening its gate only in a period during which the amplitude of the wobbling becomes a maximum one to make the generated pre-pit signal pass through the gate; and counting the number of the pre-pit signals passing through a second gate during a reference time, said second gate periodically opening its gate only in a period during which a sync bit is superimposed on the wobbling and the amplitude of the wobbling becomes a maximum one to make the generated pre-pit signal pass through the gate; and setting the binarizing level based on both the relationship between the number of the pre-pit signals passing through the first gate per the reference time and a predetermined first reference number, and the relationship between the number of the pre-pit signals passing through the second gate per the reference time and a predetermined second reference number.

17. A binarizing level setting method for setting a binarizing level for binarizing a composite signal extracted from an optical recording medium to generate a pre-pit signal, said optical recording medium having an information recording track wobbled at a predetermined frequency and pre-pits formed at a predetermined spacing on a guide track adjacent to the information recording track, said composite signal in which pre-pit signal components are superimposed on components of frequency of the wobbling, said method comprising the processes of:

provisionally setting a binarizing level for the composite signal;

comparing the extracted composite signal with the set binarizing level;

generating a pre-pit signal based on the results of comparing;

counting the number of the pre-pit signals passing through a first gate during a reference time while gradually lowering the binarizing level from a high level to a low level, said first gate periodically opening its gate only in a period during which the amplitude of the wobbling becomes a maximum one to make the generated pre-pit signal pass through the gate; and setting a level where the counted number per the reference time becomes within a predetermined range including a predetermined reference number as a reference binarizing level.

18. A binarizing level setting method for setting a binarizing level for binarizing a composite signal extracted from an optical recording medium to generate a pre-pit signal, said optical recording medium having an information recording track wobbled at a predetermined frequency and pre-pits formed at a predetermined spacing on a guide track adjacent to the information recording track, said composite signal in which pre-pit signal components are superimposed on components of frequency of the wobbling, said method comprising the processes of:

provisionally setting a binarizing level for the composite signal;

comparing the extracted composite signal with the set binarizing level;

generating a pre-pit signal based on the results of comparing;

counting the number of the pre-pit signals passing through a second gate during a reference time while gradually lowering the binarizing level from a high level to a low level, said second gate periodically opening its gate only in a period during which a sync bit is superimposed on the wobbling and the amplitude of the wobbling becomes a maximum one to make the generated pre-pit signal pass through the gate; and setting a level where the counted number per the reference time becomes within a predetermined range including a predetermined reference number as a reference binarizing level.

19. A pre-pit detecting apparatus for extracting a composite signal from an optical recording medium and binarizing the composite signal to generate a pre-pit signal, said optical recording medium having an information recording track wobbled at a predetermined frequency and pre-pits formed at a predetermined spacing on a guide track adjacent to the information recording track, said composite signal in which pre-pit signal components are superimposed on components of frequency of the wobbling, said apparatus comprising:

a binarizing level setting device for setting a binarizing level for the composite signal; and a pre-pit signal generating device for comparing the extracted composite signal with the set binarizing level to generate a pre-pit signal, wherein the binarizing level setting device counts the number of the pre-pit signals generated by the pre-pit signal generating device and sets the binarizing level based on the relationship between the counted number per a reference time and a predetermined reference number.

20. A pre-pit detecting apparatus for extracting a composite signal from an optical recording medium and binarizing the composite signal to generate a pre-pit signal, said optical recording medium having an information recording track wobbled at a predetermined frequency and pre-pits formed at a predetermined spacing on a guide track adjacent to the information recording track, said composite signal in which pre-pit signal components are superimposed on components of frequency of the wobbling, said apparatus comprising:

a binarizing level setting device for setting a binarizing level for the composite signal; and a pre-pit signal generating device for comparing the extracted composite signal with the set binarizing level to generate a pre-pit signal, wherein the binarizing level setting device gradually lowers the binarizing level from a high level to a low level, and counts the number of the pre-pit signals generated by the pre-pit signal generating device during a reference time in each level and sets a level where the counted number per the reference time becomes within a predetermined range including the predetermined reference number as a reference binarizing level.

21. A pre-pit detecting apparatus for extracting a composite signal from an optical recording medium and binarizing the composite signal to generate a pre-pit signal, said optical recording medium having an information recording track wobbled at a predetermined frequency and pre-pits formed at a predetermined spacing on a guide track adjacent to the information recording track, said composite signal in which pre-pit signal components are superimposed on components of frequency of the wobbling, said apparatus comprising:

a binarizing level setting device for setting a binarizing level for the pre-pit signal for extracting at least address information as a binarizing level for an address, and for setting a binarizing level for the pre-pit signal for extracting at least a recording/reproducing clock as a binarizing level for a clock;

a first pre-pit signal generating device for comparing the extracted composite signal with the set binarizing level for an address to generate a pre-pit signal for an address;

a second pre-pit signal generating device for comparing the extracted composite signal with the set binarizing level for a clock to generate a pre-pit signal for a clock; and wherein the binarizing level setting devices gradually lower the respective binarizing levels from a high level to a low level, and count the number of the pre-pit signals generated by the binarizing level setting device during a reference time in each level, and set a level where the counted number per the reference time becomes within a predetermined range including the predetermined reference number as a reference binarizing level, and sets the binarizing level for an address to a lower level than the reference binarizing level, and sets the binarizing level for a clock to a higher level than the reference binarizing level.

22. A binarizing level setting method for setting a binarizing level for binarizing a composite signal extracted from an optical recording medium to generate a pre-pit signal, said optical recording medium having an information recording track wobbled at a predetermined frequency and pre-pits formed at a predetermined spacing on a guide track adjacent to the information recording track, said composite signal in which pre-pit signal components are superimposed on components of frequency of the wobbling, said method comprising the processes of:

provisionally setting a binarizing level for the composite signal;

comparing the extracted composite signal with the set binarizing level;

generating a pre-pit signal based on the results of comparing;

counting the number of the generated pre-pit signals during a reference time; and setting the binarizing level based on the relationship between the counted number per the reference time and a predetermined reference number.

23. A binarizing level setting method for setting a binarizing level for binarizing a composite signal extracted from an optical recording medium to generate a pre-pit signal, said optical recording medium having an information recording track wobbled at a predetermined frequency and pre-pits formed at a predetermined spacing on a guide track adjacent to the information recording track, said composite signal in which pre-pit signal components are superimposed on components of frequency of the wobbling, said method comprising the processes of:

provisionally setting a binarizing level for the composite signal;

comparing the extracted composite signal with the set binarizing level;

generating a pre-pit signal based on the results of comparing;

counting the number of the generated pre-pit signals while gradually lowering the binarizing level from a high level to a low level; and setting a level where the counted number per the reference time becomes within a predetermined range including a predetermined reference number as a reference binarizing level.

* * * * *